United States Patent [19]
Allan

[11] Patent Number: 5,640,744
[45] Date of Patent: Jun. 24, 1997

[54] NESTED RIDGE STRAP CONNECTOR APPARATUS

[76] Inventor: Robert M. Allan, 1631 Colgate Cir., La Jolla, Calif. 92037

[21] Appl. No.: 528,528

[22] Filed: Sep. 14, 1995

Related U.S. Application Data

[63] Continuation-in-part of Ser. No. 229,825, Apr. 18, 1994, Pat. No. 5,555,608, which is a continuation-in-part of Ser. No. 5,331, Jan. 15, 1993, Pat. No. 5,345,659, which is a continuation-in-part of Ser. No. 787,424, Nov. 12, 1991, Pat. No. 5,179,767, which is a continuation-in-part of Ser. No. 553,258, Jul. 16, 1990, Pat. No. 5,088,162.

[51] Int. Cl.$^6$ ...................................................... A44B 18/00
[52] U.S. Cl. ................................ 24/442; 24/306; 24/587
[58] Field of Search .............................. 24/442, 450, 452, 24/399, 400, 16 PB, 17 DP, 30.5 P, 306, 304, 587, 577; 383/63, 65

[56] References Cited

U.S. PATENT DOCUMENTS

| | | |
|---|---|---|
| Re. 14,762 | 11/1919 | Springer . |
| Re. 24,613 | 3/1959 | Hageltorn . |
| 410,447 | 9/1889 | Rich . |
| 495,775 | 4/1893 | Bonnamy . |
| 772,412 | 10/1904 | Garrett et al. . |
| 983,093 | 1/1911 | Svenson . |
| 1,330,737 | 2/1920 | Coffman . |
| 1,620,574 | 3/1927 | Savage . |
| 1,751,926 | 3/1930 | Kielberg . |
| 1,912,180 | 5/1933 | Cornell . |
| 2,144,755 | 1/1939 | Freedman . |
| 2,249,764 | 7/1941 | Hothersall . |
| 2,499,898 | 3/1950 | Anderson . |
| 2,693,875 | 11/1954 | Chaffee . |
| 2,766,814 | 10/1956 | Sedlacek . |
| 2,780,946 | 2/1957 | McGuire . |
| 2,841,850 | 7/1958 | Zahorski . |
| 2,979,119 | 4/1961 | Kramer . |
| 2,994,117 | 8/1961 | McMullin . |
| 3,009,235 | 11/1961 | De Mestral . |
| 3,015,869 | 1/1962 | Rapata . |
| 3,020,613 | 2/1962 | Morin . |
| 3,038,225 | 6/1962 | Ausnit . |
| 3,060,611 | 10/1962 | D'Andrea . |
| 3,066,366 | 12/1962 | Wyckoff et al. . |
| 3,078,532 | 2/1963 | Bywater . |
| 3,083,737 | 4/1963 | De Mestral . |
| 3,101,517 | 8/1963 | Fox et al. . |
| 3,141,221 | 7/1964 | Faulls, Jr. . |
| 3,147,528 | 9/1964 | Erb . |
| 3,192,589 | 7/1965 | Pearson . |
| 3,247,848 | 4/1966 | Mathison . |
| 3,263,292 | 8/1966 | Fekete . |
| 3,266,113 | 8/1966 | Flanagan, Jr. . |
| 3,312,583 | 4/1967 | Rochlis . |
| 3,338,285 | 8/1967 | Jaster . |
| 3,347,298 | 10/1967 | Ausnit et al. . |
| 3,353,662 | 11/1967 | Pickin . |

(List continued on next page.)

FOREIGN PATENT DOCUMENTS

| | | |
|---|---|---|
| 1232367 | 10/1960 | France . |
| 2213686 | 10/1972 | Germany . |
| 3726618 | 2/1989 | Germany . |
| 595804 | 4/1993 | Japan . |
| 376328 | 5/1964 | Switzerland . |
| 898124 | 6/1962 | United Kingdom . |
| 1078193 | 8/1967 | United Kingdom . |
| 1161406 | 8/1969 | United Kingdom . |
| 2074461 | 11/1981 | United Kingdom . |

*Primary Examiner*—Victor N. Sakran
*Attorney, Agent, or Firm*—William W. Haefliger

[57] ABSTRACT

A connector including a strap-like looping connector configured to loop and connect to itself. Strap eyelets would be utilized to improve the connector when utilized to adjustably draw together parts of an object, such as sneaker uppers, instead of using shoe laces. Also, segments of the connector are disclosed that may be used for connection as substitutes for hook and loop-type connectors, wrist watch bands for connecting objects and other parts. Also, an improved self-connecting bundle tie-type connector is disclosed. Additionally, heavy-duty designs are disclosed that may be used as emergency engine belts or general utility.

41 Claims, 19 Drawing Sheets

U.S. PATENT DOCUMENTS

| | | |
|---|---|---|
| 3,364,530 | 1/1968 | Kraus . |
| 3,372,442 | 3/1968 | Ishimatsu . |
| 3,403,429 | 10/1968 | Smith . |
| 3,408,705 | 11/1968 | Kayser et al. . |
| 3,410,327 | 11/1968 | Ausnit . |
| 3,416,991 | 12/1968 | Yoshimura . |
| 3,494,244 | 2/1970 | Wayland . |
| 3,514,815 | 6/1970 | Evans . |
| 3,518,727 | 7/1970 | Eberle et al. . |
| 3,534,780 | 10/1970 | Hockmeyer et al. . |
| 3,546,754 | 12/1970 | Erb . |
| 3,572,191 | 3/1971 | Bannies . |
| 3,592,428 | 7/1971 | McFarlane . |
| 3,600,027 | 8/1971 | Noland et al. . |
| 3,611,620 | 10/1971 | Perry . |
| 3,619,913 | 11/1971 | Albrecht . |
| 3,620,896 | 11/1971 | Glasgow . |
| 3,633,787 | 1/1972 | Katz . |
| 3,648,404 | 3/1972 | Ogsbury et al. . |
| 3,653,099 | 4/1972 | Hoffman . |
| 3,654,052 | 4/1972 | Rye . |
| 3,686,718 | 8/1972 | Brumlik . |
| 3,708,833 | 1/1973 | Ribich et al. . |
| 3,735,449 | 5/1973 | Rosales . |
| 3,758,657 | 9/1973 | Menzin et al. . |
| 3,762,000 | 10/1973 | Menzin et al. . |
| 3,808,646 | 5/1974 | Brumlik . |
| 3,808,648 | 5/1974 | Billarant et al. . |
| 3,808,649 | 5/1974 | Ausnit . |
| 3,900,652 | 8/1975 | Uraya et al. . |
| 4,073,090 | 2/1978 | Lucia . |
| 4,147,007 | 4/1979 | Eppich . |
| 4,169,303 | 10/1979 | Lemelson . |
| 4,290,174 | 9/1981 | Kalleberg . |
| 4,322,875 | 4/1982 | Brown et al. . |
| 4,502,194 | 3/1985 | Morris et al. . |
| 4,557,024 | 12/1985 | Roberts et al. . |
| 4,614,630 | 9/1986 | Pluim, Jr. . |
| 4,674,778 | 6/1987 | Ruiz . |
| 4,727,659 | 3/1988 | Walker . |
| 4,794,028 | 12/1988 | Fischer . |
| 4,872,242 | 10/1989 | Allan . |
| 4,872,243 | 10/1989 | Fischer . |
| 4,910,362 | 3/1990 | Kinner . |
| 4,947,525 | 8/1990 | Van Erden . |
| 4,947,527 | 8/1990 | Hennig . |
| 4,984,339 | 1/1991 | Provost et al. . |
| 5,070,584 | 12/1991 | Dais et al. . |
| 5,088,162 | 2/1992 | Allan . |
| 5,113,599 | 5/1992 | Cohen et al. . |
| 5,158,767 | 10/1992 | Cohen et al. . |
| 5,179,767 | 1/1993 | Allan . |
| 5,253,435 | 10/1993 | Auger et al. . |
| 5,344,296 | 9/1994 | Laninga . |
| 5,345,659 | 9/1994 | Allan . |
| 5,383,290 | 1/1995 | Grim . |

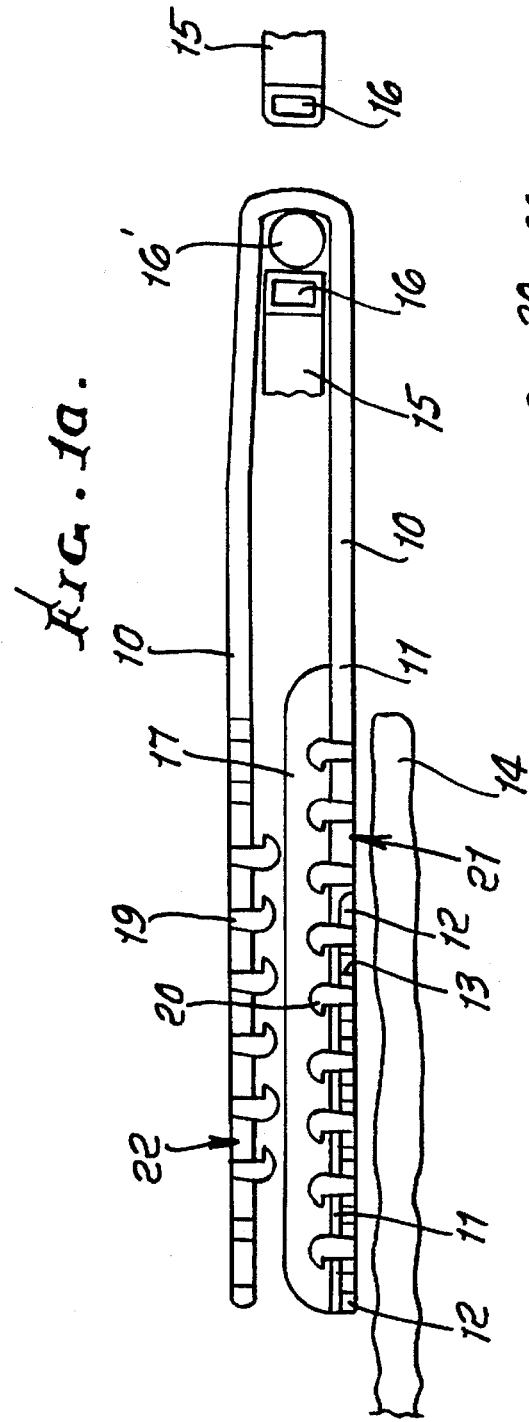
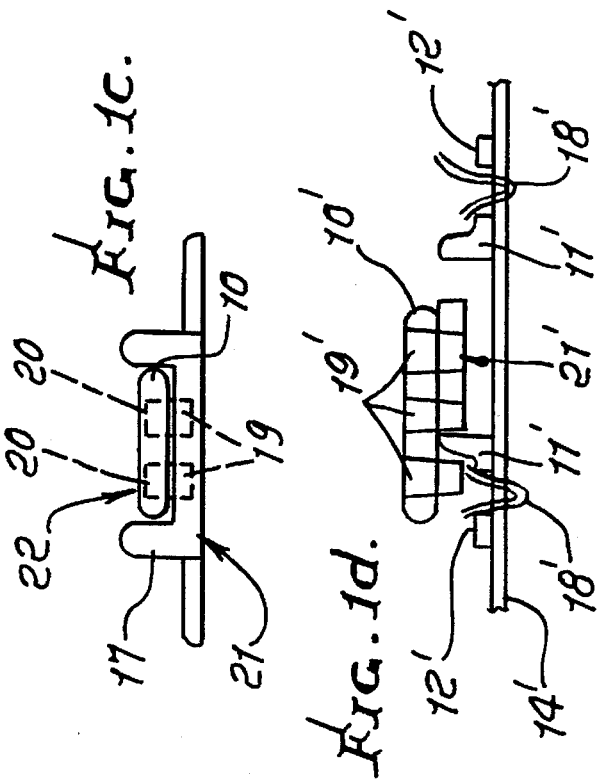
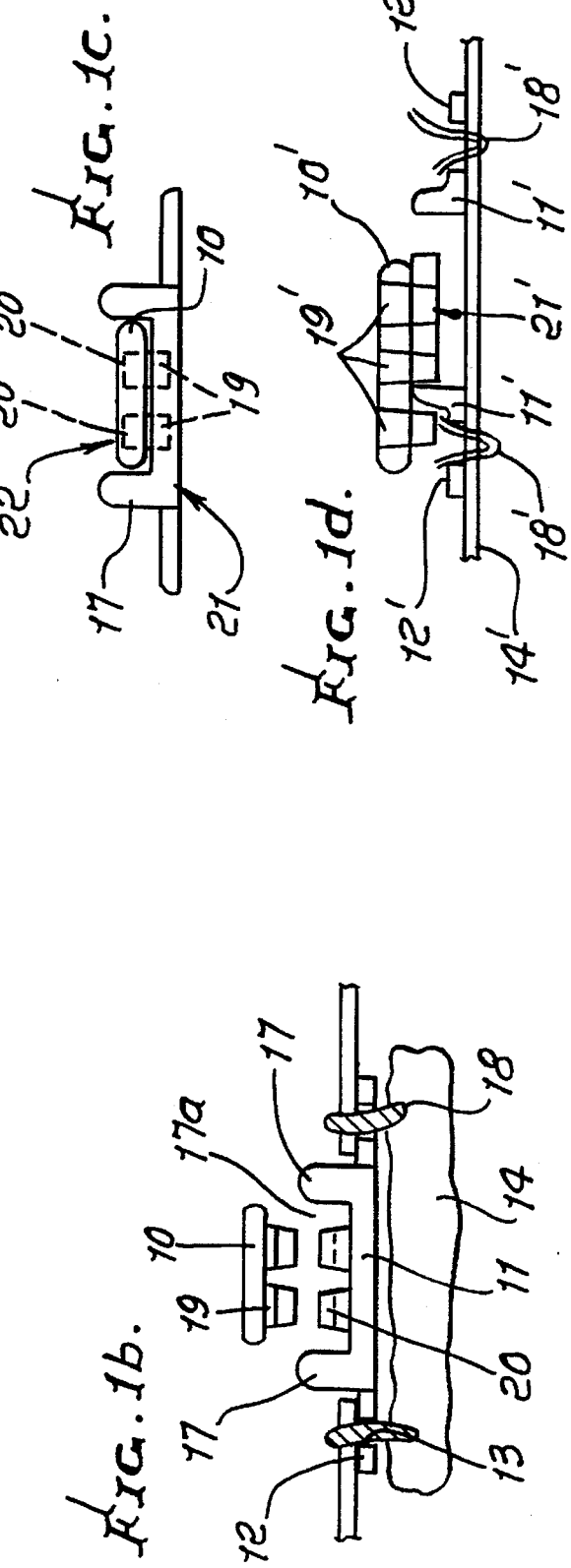

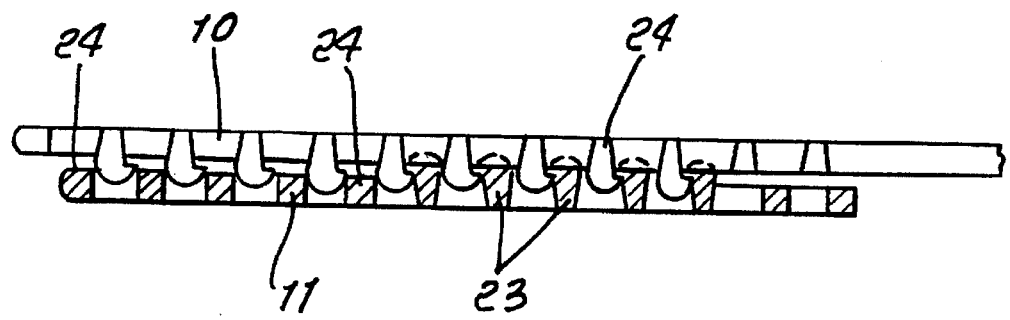
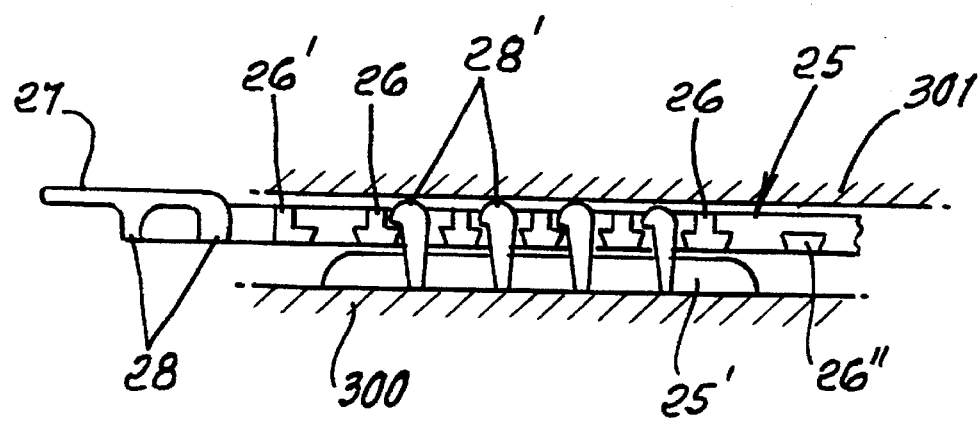
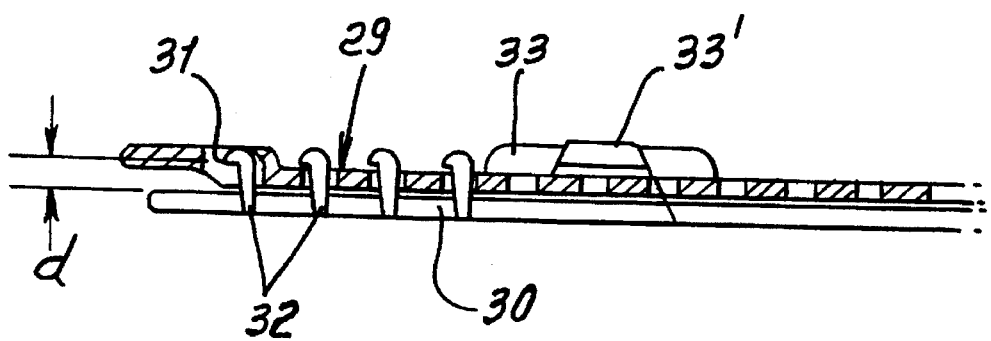

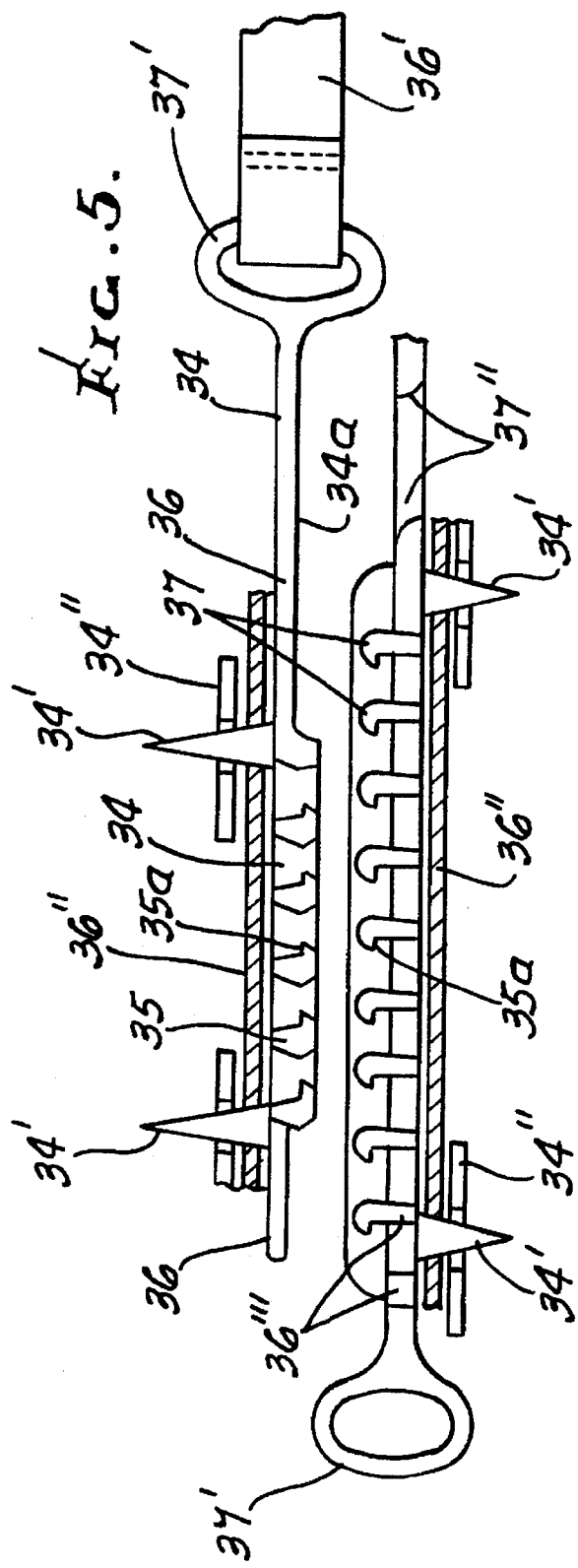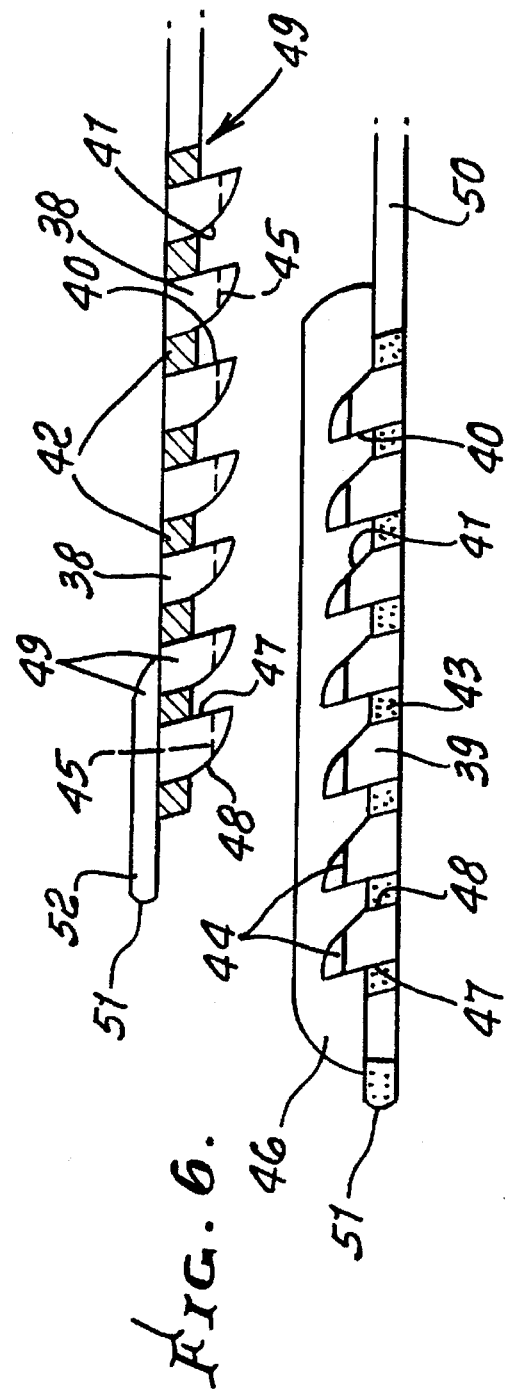

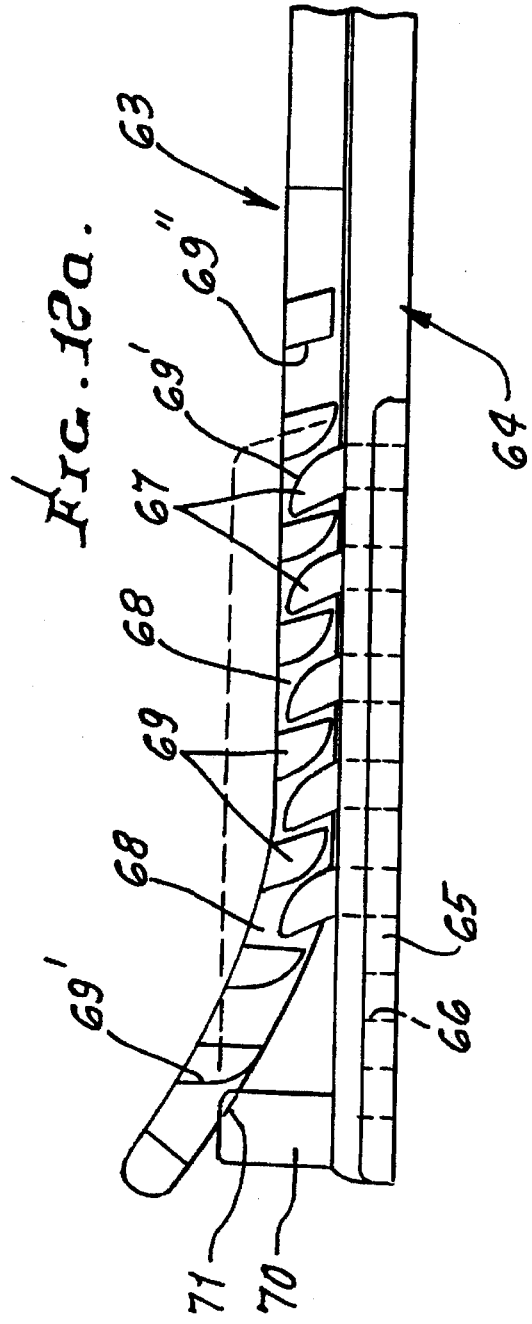
FIG. 12a.
FIG. 12b.
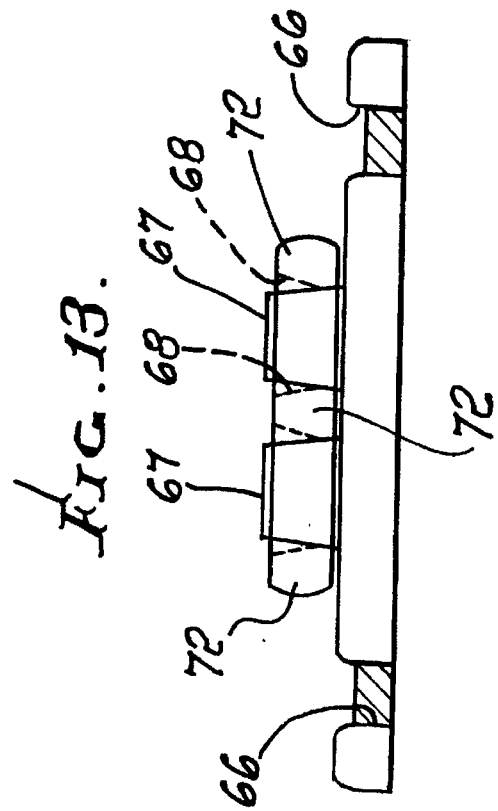
FIG. 13.

NESTED RIDGE STRAP CONNECTOR APPARATUS

BACKGROUND OF THE INVENTION

This application is a continuation-in-part of prior U.S. application Ser. No. 08/229,825 filed Apr. 18, 1994, now U.S. Pat. No. 5,555,608 which is a continuation-in-part of prior U.S. application Ser. No. 08/005,331 filed Jan. 15, 1993, now U.S. Pat. No. 5,345,659, which is a continuation-in-part of prior U.S. application Ser. No. 07/787,424 filed Nov. 12, 1991, now U.S. Pat. No. 5,179,767, which is a continuation-in-part of prior U.S. application Ser. No. 07/553,258 filed Jul. 16, 1990, now U.S. Pat. No. 5,088,162, and all of which are incorporated herein by reference.

The referenced U.S. Pat. No. 5,088,162 relates generally to an elongated, strap-like connector configured to loop and adjustably connect opposing strap ends using ridges which nest in C-shaped openings between ridges. Such ridges have hook, ratchet or rounded cross sections. Also, random sections of the strap-like connectors were disclosed that could be affixed to objects, so as to allow their connection. Teeth could be added to control movement of the nested ridges in the C-shaped openings. Means to confirm interlock were also disclosed and claimed.

Certain improvements to the invention were claimed in reference to U.S. Pat. No. 5,179,767. One major improvement was the combining of the larger and smaller ridges, so that connector parts consisted of one cross section configuration, instead of two. If used on a small strap, each side of the strap could be looped and connected to the same side or the opposite side. Flexing of the ridges allowed the simultaneous nesting of the series of ridges, even though their outer, cross section widths were greater than the openings into which they would be inserted.

Additional improvements to the invention were claimed in referenced application Ser. No. 08/005,331 filed Jan. 15, 1993. One such improvement was a flexible, hook-like, tapered ridge suitable for vertical removal from a mold, due to its ability to straighten. The tapered, flexible design allowed for a more complex connector. Virtually unlimited numbers of rows or clusters of ridges could be positioned, both laterally and longitudinally. Previously, only one or two rows of ridges, using an injection mold, were practical, without using a relatively expensive and complicated mold. The connector using the flexible, hook-type ridge disclosed in application Ser. No. 08/229,825 gains its shear strength in numbers of connections, and may be used as an advantageous alternative to hook-and-loop type connectors. Application Ser. No. 08/229,825 also disclosed generally inflexible ridges designed with ratchet and/or hook-like cross sections and an improved buckle connector.

The disclosures in herein applicant's U.S. Pat. Nos. 5,038,162 and 5,179,787 provided for C-shaped cross sections formed by the side walls of ridges of a strap-like connector, including a shoe connector. The ridges had a strap-like base and an outermost portion, with hook-like cross sections.

In application Ser. No. 08/229,825, the improved design eliminated the base or center of the C-shaped cross section, so that the undercut portion of the ridge could be formed by a mold protrusion of the improved mold design, which improved the flexibility of the connector and allowed an improved nesting fit and interlocking of the ridges.

With certain types of connectors, such as shoe connectors, it is desirable to have individual ridges with a great deal of shear strength. Individual, flexible, and tapered ridges lack a great deal of shear strength. Also, it would be desirable if a shoe strap or other device strap could be joined to another element with little or no pressure. In addition, a shoe strap would be easier to use, if the ridges were recessed within the strap. Many of the ridge designs previously disclosed became flexed during connection, which, for certain applications, required greater mechanical pressure than desirable. Loosely fitted, generally inflexible or flexible ridge-to-ridge type connectors, as disclosed in application Ser. No. 08/229,825, and herein, can have ease of connection and disconnection, while having far greater shear strength than the previously disclosed tapered, flexible, ridge-type connectors. This would enable more versatile designs than previously possible, because they are designed to be molded, or may be molded, using an improved injection mold design.

In addition, it would be desirable to combine the disclosed shoe strap and looping strap with a shoe strap eyelet to improve leverage and tension. The connectors of the present invention permit elimination of shoelaces and are much more easily finger manipulated than shoelaces.

SUMMARY OF THE INVENTION

It is a major object of the present invention to provide improved connector structures that meet the needs referred to above. Basically, the improved connector structure comprises:

a) an elongated connector in the form of a strap adapted to be adjustably folded back on itself, b) a support and a strap eyelet located on the support to receive and guide feeding of the strap therethrough, and allow strap tightening during the adjustable folding back of the strap, c) and interlockable ridge means at different locations on the strap such that the ridge means register during the strap tightening, to be pressed together for adjusted and confirmed complete interlock, thereby to hold the strap in and against dislodgement from folded back condition.

Another object of the invention is to provide a connector configured to adjustably draw together and connect two parts of an object, such as the upper portions of a sneaker or boot, by using strap-like connectors in combination with strap-eyelets which will provide alignment and tightening means, so that the user may gain leverage when bringing the strap back upon itself.

It is a further object that the connectors described be used where hook-and-loop type connectors may not be ideal, due to problems with dirt, mud, snow, water, woven materials, lint, and wearing out too soon, or the need to sanitize, such as at hospitals, and/or simply to meet the need for a smaller, stronger connector.

It is an additional object of the invention that the parts to be connected encompass a wide variety of objects, or parts of one, two or more objects. Examples of such objects and parts are: straps, parts of tents, suitcases, various containers, tote bags, back packs, helmets, pulleys, bundles of wires, wrist watches, water sports equipment, sneaker and boot uppers, instead of shoelaces, and the like.

It is yet a further object of the invention that the first end of a strap connector be affixed to a part, such as a shoe upper, and that on either side of that straps's first end, a longitudinal rib forms a C-shaped channel of sufficient height that, when the second end of the connector is looped through an aligned eyelet, pulled tight and press fitted to the first end, the second end becomes nested and protected from dislodging due to a scraping blow, such as from another shoe as in a contact sporting event.

It is an additional object of the invention that a means of protection against a scraping blow for the strap's first end, using an adjustable connection, is to thread it through an eyelet prior to its initial spanning between two sections.

It is an additional object of the invention that a connector strap have shoulders or flanges suitable for sewing the first end of the strap to a first part, such as a shoe upper; and a strap eyelet is on a second part, so as to allow the strap to be looped and adjustably draw parts together.

It is another object of the invention that the second end of the strap have either raised or recessed ridges; and that recessed ridges are such as to make the strap less rough and more comfortable to pull. Also, a strap with recessed ridges or slots may be adjustably connected at one or both ends to base connector members.

It is a further object of the invention that the center portion of a strap may be free of ridges and/or holes, so as to provide a potential location for a brand name or logo. Yet another object is to provide the second end of a strap with slots spaced to receive strap first end ridges, which would penetrate through and hook on the strap.

Application Ser. No. 08/229,825, referred to above, disclosed a tongue means to flexibly fit into buckle means and provide a ratchet-like, adjustable lock. It is an object of the invention that the first end of a strap have holes or slots configured to allow connection to a hook-like ridge, and the opposite end of such a strap is provided with similar holes or slots configured to flexibly fit into said buckle means.

It is yet another object of the invention that ridges may slope or narrow further from their connection to the connector members, so as to improve or ease nesting of inverted ridges, with widths at their bases approximately equaling the distance between connector members between which they are configured to be inserted.

It is an object that the holes or spaces between ridges are larger than the ridges to be inserted, to accommodate for changing alignment when connecting the strap-like connector in an arc over a curved surface.

It is a further object that ridges may have small extensions at their lateral ends connecting the ridges to the connector members, the extensions not projecting above the connector members and providing additional clearance for said ridges to nest with thread when the connector is sewn onto an object.

It is an added object to provide for a ratchet-like connector that may be connected to a first part, then looped through an eyelet or other alignment means, and wherein the strap is held in place through tension on ratchet-like ridges and/or another means, such as a C-shaped member, configured to grip the sides of the strap.

An additional object is to provide a plurality of ridges with hook sides that face the side of a connector; and they, and the adjacent connector members, are tilted in a longitudinal direction and ratchet-like, so that the outer hook portions of a similar configured connector section will interlock, allowing a ratchet-like, one-way, adjustable connection after the initial connection is made.

It is a further object that a ratchet-like connector achieve initial connection where the connector must be curved over a curved surface, such as a person's arm, but good interlock is achieved when some ratchet-like ridges mesh.

It is an added object of the invention that the ratchet-like connector use only one or two ridges laterally on a strap-like connector, or alternatively, numerous lateral rows of ridges would be used for a wider ratchet-like, adjustable connector.

Yet another object of the invention is to provide a partially inflated bladder added to a shoe, and a connector be positioned on the shoe so that, when looped through an eyelet means and tightened, pressure is applied to the surface of the bladder, which in turn increases the internal pressure of the bladder, which in turn tightens the fit. Yet another object is to provide the bladder in a shoe tongue in combination with the looping connector and strap eyelet.

It is an added object of the invention that a connector have ridges with single or multiple hook-like cross sections, and/or with hooks having downwardly or upwardly projecting chisel-like cross sections, and have sufficient space between two ridges located, to allow the insertion of a similar configured ridge, substantially without mechanically spreading the two ridges further apart, so that the connection of connector parts occurs with minimal mechanical resistance.

It is a further object of the invention that the connector designs herein disclosed lend themselves to use of simple, injection-type molds forming strong, thermoplastic, rubber or other materials into flexible or inflexible ridges, with the undercut hook portion of a ridge formed by a protrusion from one mold part.

It is yet another object of the invention that a strap-like connector have ratchet-like ridges, the connector configured to provide ratchet-like tightening when pulled across another connector part, and wherein the strap-like connector's ratchet connection is to be confirmed by a C-shaped or other connector confirming means.

It is an additional object of the invention that, if the strap-like connector has wider longitudinal connector members, they then slope laterally, so that pressfitted, misaligned ridges will be deflected laterally into holes formed by connector members and ridges.

It is a further object of the invention that sewing shoulders be added to the connector, which may be offset and lower than the farthest projection point on a row of nesting ridges, and so that the nesting ridges may overlap the sewing shoulder, and so that precise alignment of two connectors is not necessary.

It is an added object of the invention that the connector incorporate one or more pairs of metal spikes and backing plates, the spikes configured to penetrate cloth, then bend around and affix to the backing plates. Such spikes and plates are typically of a design similar to those of spikes and plates that are used to affix metal hooks and slots to clothing, such as commonly used to fasten men's pants at the belt line, so that the connector of the invention may be affixed to articles of clothing using the metal spikes and backing plate to provide adjustable connection for clothing and the like, instead of hooks, buttons, zippers, and hook-and-loop connectors.

It is another object of the invention that a connector form a grid or web consisting of rows of alternating ridges and holes in one direction capable of nesting similar or dissimilar ridges in the holes between the ridges, and that alternating rows of ridges and connector members be extended at right angles to the ridges, and wherein ridges of two connected connector parts will nest in holes of the opposing connector part; and connector members of one connector part will nest between ridges of the other connector part, so that generally ridges and connector members of both connector parts intermesh.

It is an additional object of the invention that the connector be connected to parts by injection molding, welding, sewing, sonic welding, metal spike-like clips, strap eyelets, and other means.

It is an object that a looping, strap-like connector have ridges on both sides, raised, or partially raised, on both sides or raised on one side and recessed on the other, so that the recessed, smooth side could be looped around a bundle, as for instance as a bundle tie. Alternately, a larger, similar connector could be looped around pulleys and used as an emergency fan belt or heavy-duty strap connector.

It is a further object of the invention that ridges used for fan belts where there is risk of fatigue, due to near continuous flexing of the belt around pulleys, have interlocking, flat surfaces configured to prevent ridge flex.

It is another object of the invention that a wrist watch band may utilize one or more rows of ridges instead of a buckle, and wherein a preferred embodiment of said strap would have one part of the strap with outwardly projecting raised ridges configured to connect to downwardly projecting recessed ridges.

It is another object of the invention that ridge outer terminus portions may be rounded in cross sectional view and/or have a sloping or rounded profile to guide ridges into meshed nesting between ridges and connector members.

It is another object that the configurations of the ridges, holes and connectors promote near-automatic nesting of ridges when connector parts are generally aligned and press-fitted together.

It is an object of this invention that, laterally or longitudinally, a connector may have one or more rows of ridges which may have single or double-ended ridges.

It is yet another object of the invention that the objects, disclosures, claims, drawings, and art, which are contained herein and in prior applications of applicant, constitute a new technology of related, easy to produce, strong, desirable, and practical connectors.

It is a further object of the invention that the connectors herein disclosed are usable for, and may be substituted for, all claimed and disclosed uses for hook-and-loop type connectors and VELCRO™, which are of public record at the U.S. Patent Office.

It is an added object of the invention that the improvements claimed herein apply to previous disclosures, drawing and uses of the patents and applications of which this application is a continuation-in-part.

It is another object of the invention that the flexible and generally inflexible connector designs and uses disclosed in previous patent applications of applicant are applicable to the looping connectors, as claimed herein.

These and other objects and advantages of the invention, as well as the details of an illustrative embodiment, will be more fully understood from the following specification and drawings, in which:

DRAWING DESCRIPTION

FIG. 1a is a schematic view of one form of connector apparatus, looping and returning through an eyelet, with connector parts aligned as per the sectional view shown at FIG. 1b, parts connected in sectional view are shown at FIG. 1c; and FIG. 1d shows a connected sectional view with an upper connector portion having a greater number of ridges;

FIG. 2 is a partial schematic view of a modified version of the connector of FIG. 1, after connection is made;

FIG. 3 is a schematic view showing an alternate recessed ridge design of downwardly projecting recessed ridges connected to upwardly projecting raised ridges;

FIG. 4 is a schematic section showing retention of a strap by ridges on a base connector penetrating slots;

FIG. 5 is a schematic elevational view of connector parts aligned for connection, and with two examples of ways to connect such parts to clothing, straps, and the like;

FIG. 6 is a schematic view like that of FIG. 1 showing ratchet-like sloping ridges turned 90° relative to ridges seen in FIG. 1;

FIG. 12a is a schematic view of connector parts with meshing of recessed and raised ratchet-like ridges;

FIG. 12b is a section showing retention of the strap of FIG. 12a a C-shaped connector;

FIG. 13 is a section like FIG. 12b showing an alternate method of retention of an upper strap portion of a locking connector, with recessed ridges of FIG. 12a, showing raised ridges meshed in slots between recessed ridges and held by compression of side walls and/or tension applied to a connector;

DETAILED DESCRIPTION

Figure 7:
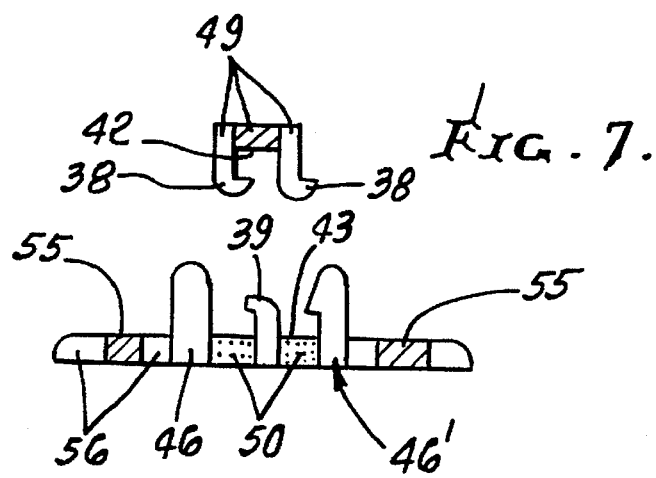
FIG. 7 is a view like FIG. 1b showing aligned pre-meshing position of the FIG. 6 connector.

FIGS. 1a and 1b show a specialized connector used to adjustably draw together and connect first part 14 and second part 15 of an object. Loose end of strap 10 is aligned above fixed end 11 of the strap, with optional sewing ledge 12 and thread holes 13. The free end of the strap 10 loops through strap eyelet and alignment means 16, which has optional roller 16'. Ribs 17 of channel 17a guard against accidental dislodgement of strap 10 after connection. Stitching may be added at 18, as seen in FIG. 1b, which also shows hook-like ridges 19 of strap portion 10 aligned to nest or mesh downwardly in holes formed by ridges 20 and connector members 21 of strap 11. See FIG. 1c. Ridges 20 likewise nest or mesh between ridges 19 of strap 10 and connector members 22 of strap 10.

FIG. 1c shows ridges 19 and 20 intermeshed between connector members 21 or 22. FIG. 1d shows alternate configurations for three or more lateral rows of ridges 19', with sewing shoulders 12' offset and lower than nested ridges 19', so as to provide clearance for ridges 19' of unaligned connector 10' and stitching 18' connecting fixed end of strap 11' to first part 14'.

Ridges, like 20 of FIGS. 1a, 1b and 1c, are not shown at FIG. 1d for clarity. It should be understood that the offset sewing shoulder design disclosed at 12' is suitable for connectors using ridges or ratchets, whether they loop through eyelets, or are stitched, or otherwise attached to parts, straps, etc., and may be utilized for one or both connector parts to be connected, when exact alignment is not important. Note that ridges 19 and 20 extend laterally; and strap or straps 10, 10a and 11 extend longitudinally. Also, it should be understood that recessed and raised, single and double-hook, ridges, as shown elsewhere in this application and prior applications of applicant, that are flexible or generally inflexible, may be substituted for ridges 19 and 20.

FIG. 2 is a partial schematic view of the connector of FIG. 1 showing strap end 10 now connected to strap end 11. Raised portions of hooks 23 have been deleted at 24 to facilitate ease of disconnection. The connector is designed to loop through an eyelet, as at 15 in FIG. 1, or alternatively, portions of the connector may be sewn or otherwise attached to straps or other objects.

FIG. 3 is a partial schematic view of alternate longitudinal strap 25 (i.e., an alternative to strap loose end 10 of FIGS. 1 and 2). Inverted ridges 26 are recessed and flush with the surfaces of strap 25. End tab 27, and non-connecting ridges 28, assist pull up disengagement of the strap 25 from lower connector 25'. Upper and lower longitudinally extending straps 25 and 25' may be sewn or sonic welded onto a base or bases 300 and 301, such as an auxiliary strap, clothing or various parts of an object, as desired. Ridges 28' may have single hook cross sections, as shown, or double hook cross sections, like 61 in FIG. 11. Hooked ridges 28' connect to hooked ridges 26.

Straps 25 may be double-ended and connect to another base connector, like 25', but in mirror image relation with hook ridges facing the opposite direction, Alternate recessed ridges 26' may have a single hook element, or only hook portions of ridges may be used, like 26".

FIG. 4 shows longitudinal strap 29 joined to connector base 30. Strap 29 has thinner cross section than the distance "d" between hook terminuses 31 of ridges 32, and upper surface of connector base 30. Optional strap protector channel of parallel ribs 33, like 17 in FIG. 1b, is associated with inverted C-shaped strap eyelet 33' connected to base 30 and through which strap 29 has been threaded. Eyelet 33' serves to guide the strap, as it is relatively displaced endwise or longitudinally.

FIG. 5 shows aligned preconnected free end longitudinal strap 34 with recessed, downwardly projecting ridges 35, which have a less rough and more comfortable surface to grip, pull and tighten versus straps with raised ridges, as at 19 in FIG. 1. See ridge tangs 35a. Non-ridge area of strap 34, as at 36, is upwardly offset at 34a, so as not to jam against lower upwardly projecting ridges 37, during connection. Strap 34 may be endwise attached to a woven strap 36', using strap eyelet 37', or by other means of attachment.

In a preferred embodiment, strap eyelet 37' would be rotated 90°, so that strap 36' would be parallel to strap connector 36 in planar reuse. Strap designs at FIGS. 1–26 herein may also be similarly attached. Free end of connector 36 may, if desired, be threaded through strap eyelet 37" to further control possible accidental disconnection. Also, pairs of metal spikes 34' attached to connector 36 and 36'" may be used instead of strap eyelet 37' to penetrate cloth panels 36" and connect to metal backing plates 34".

Spikes 34' are configured to be bent over to form a C-shaped, clamp-type connection to metal backing plate 34". Ridges 37 are integral with lower longitudinal straps 36'". Hooked, laterally extending ridges 37" are adapted to connect to hooked laterally extending ridges 35 when pushed together. Tangs 35a on the upper and lower ridges extend oppositely, as shown.

Figure 11:
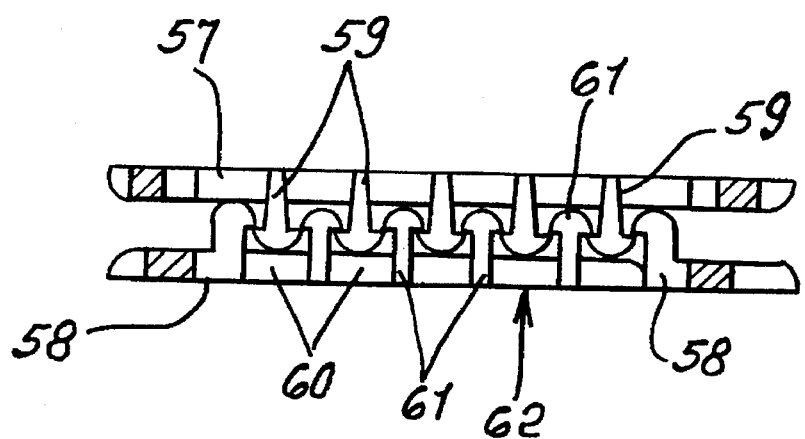
FIG. 11 is a view like FIG. 10 showing alternate ratchet-like ridges, with ridge hooks engaged as in FIG. 8, prior to complete meshing, as in FIG. 9.

FIG. 6 shows a schematic view of a ratchet-like, flexible connector, which may be used as a narrow, longitudinal strap, as at FIG. 1, or as a wider connector, as in FIG. 11.

Interlocking parts of ridges 38 and 39 are rotated 90° relative to tangs on ridges shown at FIGS. 1–5; and their lateral ends are ratchet-like and sloping at 40 and 41. Connector members 42 and 43, seen in FIG. 7, also are ratchet-like and sloping. Ridges 39 have hook-like flanges 44 projecting laterally sidewardly to engage hook-like flanges 45 projecting oppositely laterally sidewardly. It should be understood ridges 38 and 39 may, alternately, be generally rectangular, like ridges 19 and 20 in FIG. 1b, but placed at 90° with end portions 47 and 48 being non ratchet-like and vertical-like ridges 19 and 20 of FIG. 1b.

FIG. 7 shows structure of FIG. 6 in schematic sectional view, like FIG. 1b, with free end of connector 49 aligned above fixed base portion 50. One half of strap protector channel rib at 46' (which extends longitudinally) functions like hook-like ridge 39. Ridges 38, when nested, will nest between connector members 43 in a ridge to connector member ratchet-like connection. Similarly, ridge 39 will nest between connector members 42 in a ridge to connector member ratchet-like connection 42. Base portion 50 has sewing shoulders 56' with thread holes 55'. Free end of connector 49 may be sewn or otherwise attached to a strap of a different material, such as a cloth helmet strap or onto men's trousers.

Figure 8:
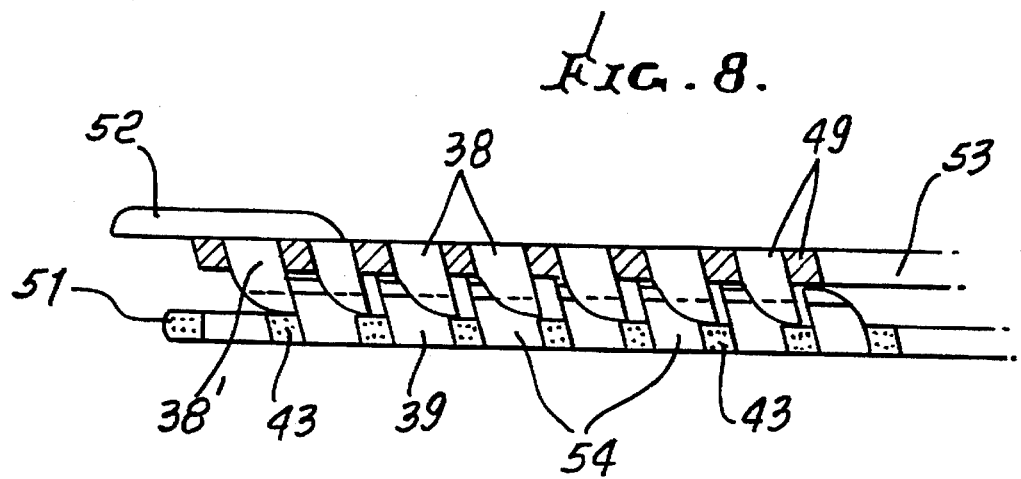
FIG. 8 is a schematic view of the connector of FIGS. 6 and 7 with ridge hooks engaged and ridges required to be moved longitudinally to allow complete meshing between two strap-like members.

FIG. 8 shows the connector of FIGS. 6 and 7 partially connected. Ridges 38 are resting on connector member 43 of connector base portion 50 and may be advanced in direction of base portion end 51. Alternatively, if tension is applied to the free end of strap 49 at 53, ridges will move in the direction of 53 slightly loosening a looping connection and allowing ridges 38 to mesh into holes 54 between ridges 39 and connector members 43.

Figure 9:
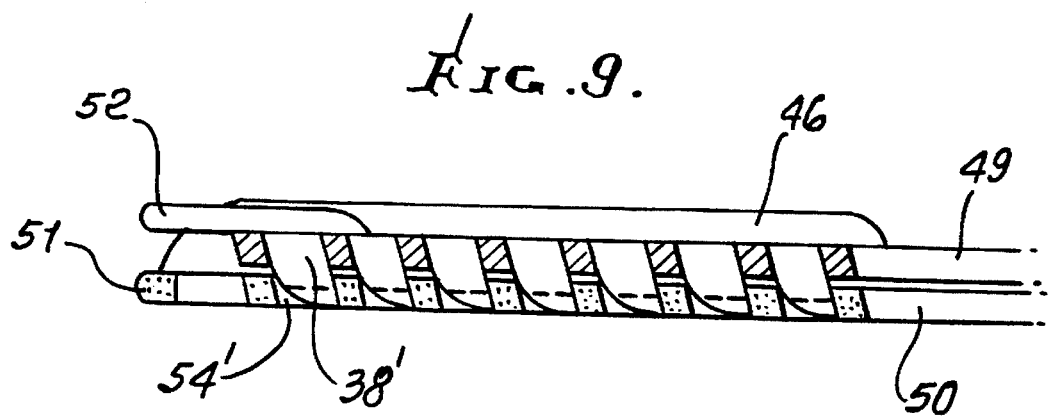
FIG. 9 is another schematic view of the connector of FIGS. 6, 7, and 8 showing full meshing of ratchet-like ridges.

FIG. 9 shows where connector of FIGS. 6, 7, and 8 has achieved full interlock. Ridge 38' has meshed into hole 54'. Tab 52 is not interfered with by ridges 39 of FIG. 6, which are hidden in this view.

Figure 10:
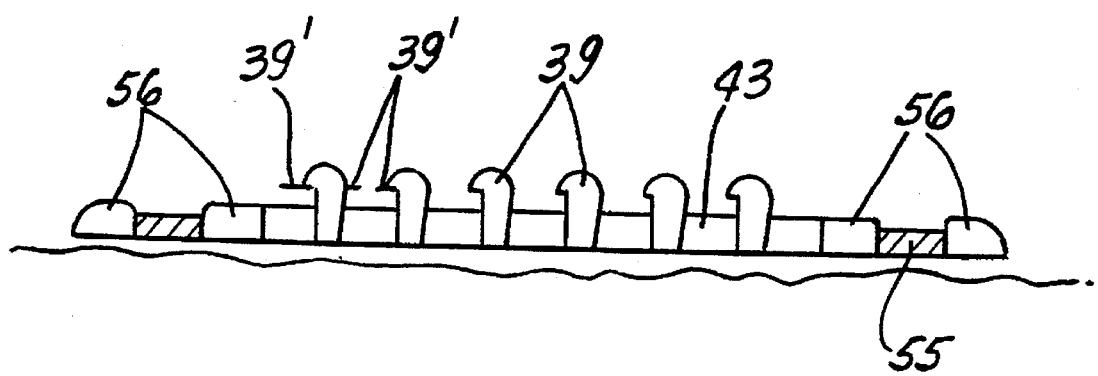
FIG. 10 is a view like FIG. 7 showing a larger number of ratchet-like ridges.

FIG. 10 shows ratchet-like connector of FIGS. 6, 8, and 9, with a greater number of connecting ridges 39, which may be connected or sewn onto parts of an object or two objects. In a preferred embodiment, sewing shoulders are offset, like at 12' of FIG. 1d. Ratchet tightening of connector parts is perpendicular to the cross section view. Flexible, small extensions 39' may be added, if desired, to adjust and fine tune vertical nesting. These extensions may be utilized one or more per ridge on one or more ridges of FIG. 10 or on other ridge designs.

FIG. 11, like section at FIG. 10, shows alternate cross-sectioned view of connector of FIGS. 6, 7, 8, and 9. Connector upper portion 57 is shown partially meshing with lower connector 58 generally reflecting the schematic view of FIG. 8. When fully meshed, ridges 59 will drop into openings 60 between ridges 61 and connector members 62.

FIG. 12 is an enlarged partial sectional view of looping connector 63, with strap eyelet, like at 16, FIG. 1 (not shown) with base connector portion 64, sewing shoulder 65, and thread holes 66 spaced in the preferred embodiment at approximately 5 to 9 per inch. Ridges 67 of base connector are raised, ratchet-like and nest in hole 68 between recessed ridges 69 of looping connector 63. A C-shaped connector 70 nests connector 63. Connector 63 is shown in partial peeling disconnection at 71. Ridges 67 and 69 are shown with a curved surface 69'. Alternatively, they could have an angular surface, as at 69". FIG. 12b is a cross sectional view of strap 63 held in place by C-shaped connector 70.

FIG. 13 shows alternate methods of fully connecting strap connectors of the type 63 without the use of C-shaped connector 70. Ridges 67 are slightly trapezoid in cross section and are pinched and held by compression in the slot 68 formed by ridges 67 and/or connector members 72.

Figure 14:
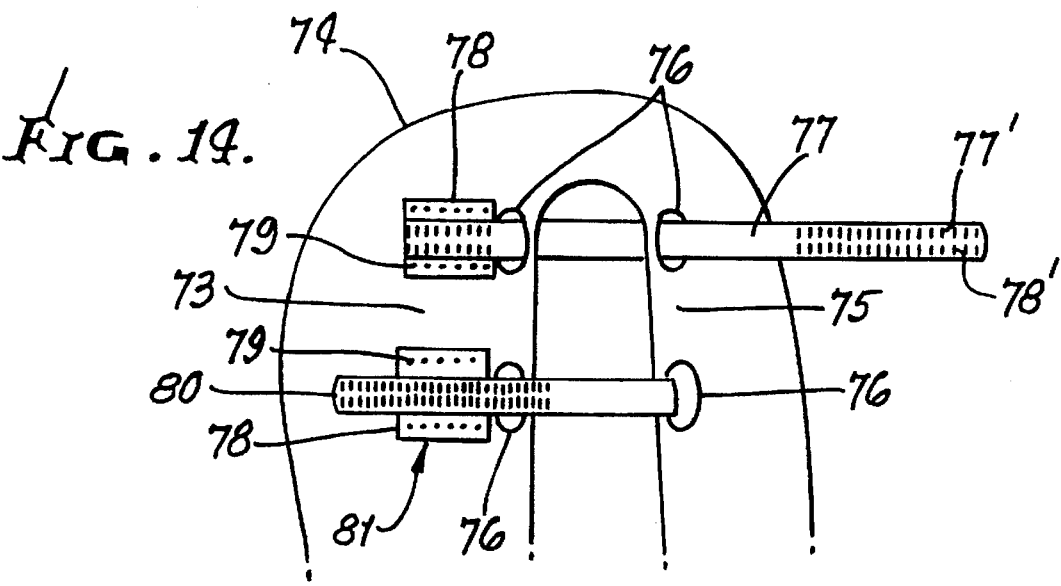
FIG. 14 is a plan view of one form of the looping connector apparatus showing one end of each strap permanently connected to a part of an object, spanning the opening between said parts.

FIG. 14 shows a plan view of first part 73 of object 74 and second part 73, each having strap eyelet and alignment means 76. Strap 77 has non-adjustable end, with sewing shoulder 78 sewn onto part 73 using optional formed holes 79. Strap 77 may use strap designs shown at FIGS. 1, 12, 15, and 21–37, and configurations previously disclosed in the patents and patent application of the applicant. Strap at 77 has not been connected, while strap at 80 has been adjustably connected to base connector 81, which includes sewing shoulder 78. Two longitudinal rows of ridges 77' and 78' are shown on strap 77; however, one or greater number of rows may be used, if desired.

Figure 15:
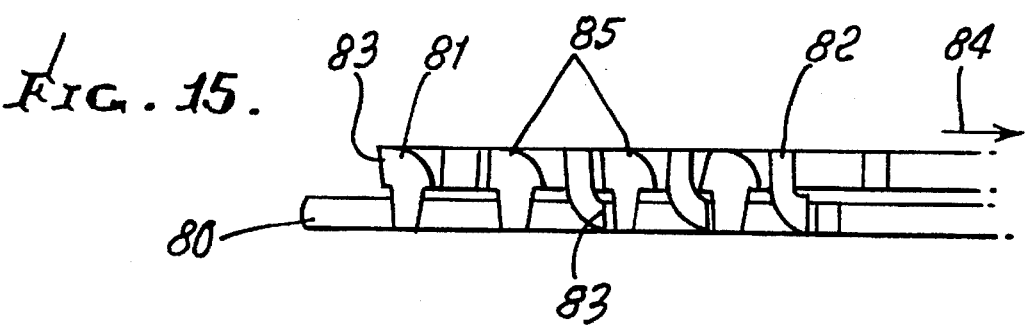
FIG. 15 is a schematic view showing single, hook-like ridges with parallel meshing surfaces and interlocking double hook-like ridges.

FIG. 15 shows a schematic view of a base connector 80 with double hook-edge ridges 81 suitable for connecting to downwardly projecting single hook ridges 82, or recessed double hook ridges, like 26 in FIG. 3, may be utilized. Hooks 81 and 82 have reverse tilt chisel faces 83 to improve meshing of ridges 81 and 82 when ridges 82 are moved in direction of 84 across surface of base connector 85 ridges 81.

Figure 16:
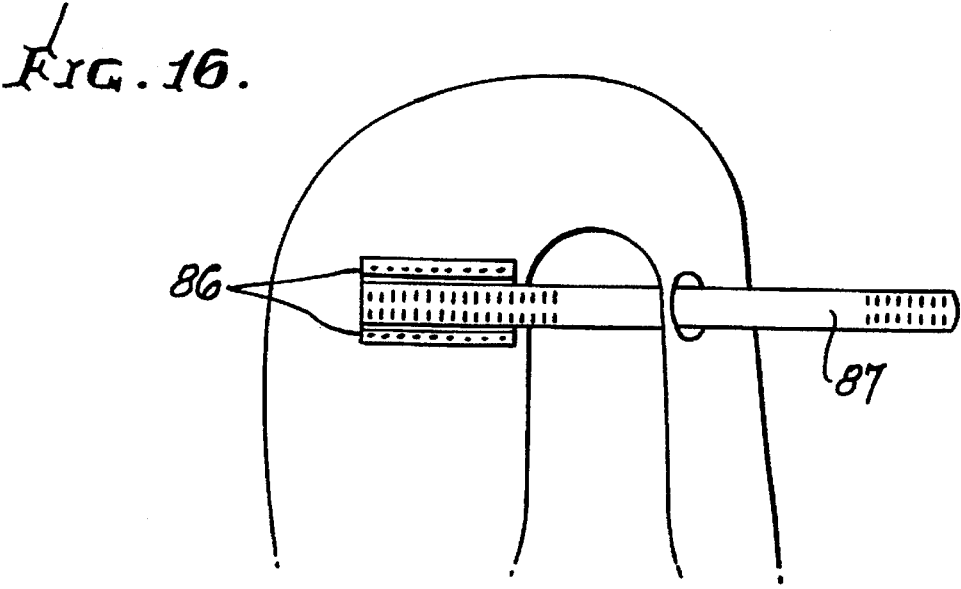
FIG. 16 is a plan view of one form of the looping connector apparatus, with one strap eyelet used to improve leverage during connection, and sewing strips adjacent to raised ribs.

FIG. 16 shows plan view strap-like connector 87, like 77 of FIG. 4, with C-shaped rib channel 86, like 17 of FIGS. 1a, 1b and 1c.

Figure 17:
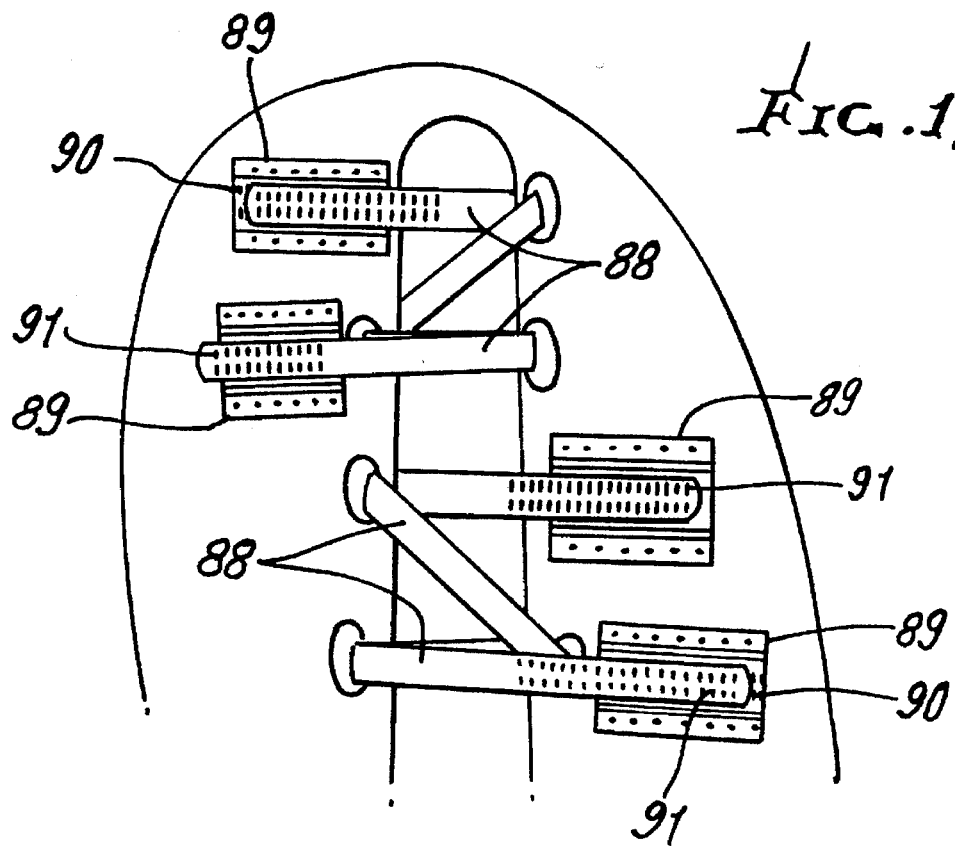
FIG. 17 is yet another plan view of connector apparatus like that of FIG. 16 but showing multiple straps adjustable connectible at each end to base connector parts.

FIG. 17 shows plan view of two elongated straps 88. Each strap 88 may be adjustably connected at each end to base connector parts 89, which have shear-resistant ridges 90. Straps 88 may have recessed or raised ridges 91. In a preferred configuration, straps 88 may have double hooked, recessed ridges 91, like 26 in FIG. 3, or rectangular, recessed ridges like 29 in FIG. 4.

Figure 18:
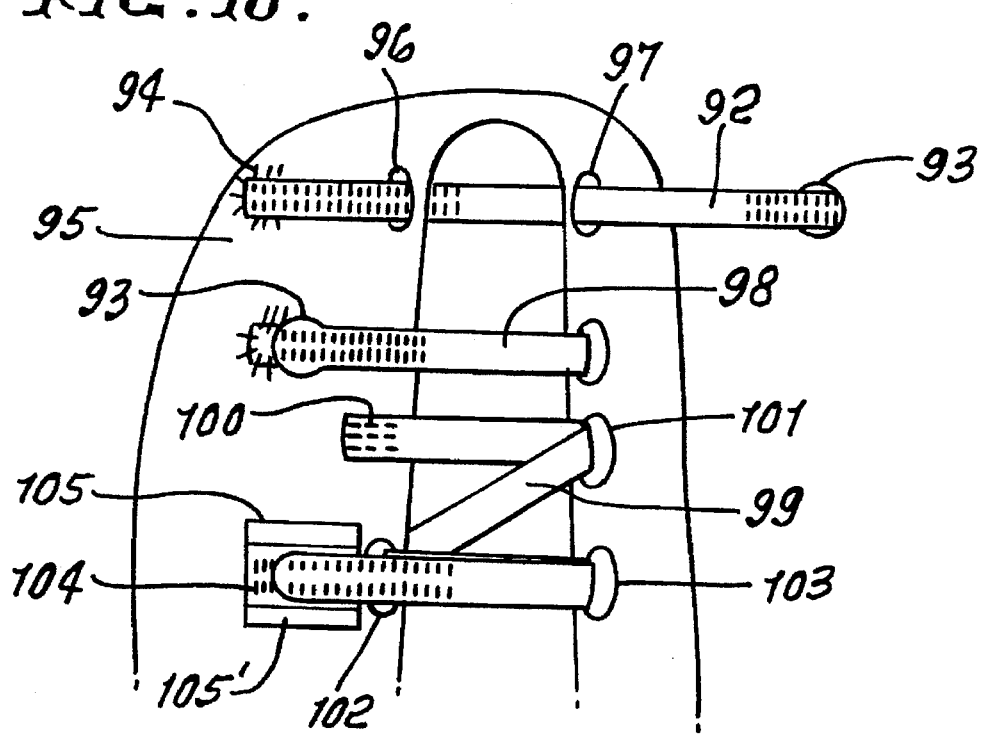
FIG. 18 is another plan view of the connector apparatus showing use of three straps.

FIG. 18 shows a plan view of first strap connector 92, with tab 93 for ease of peel-like disconnection, sewn at 94 to first part 95. Strap eyelet 96 improves strap 92 connection to part 95, while second eyelet 97 gives leverage and alignment when strap 92 is pulled and connected, like strap 98. Strap 99 is not connected to itself, but rather it is stitched or otherwise connected at 100 to first part, then looped three times through eyelets 100, 102 and 103 to connect to ridges 104 on base connector part 105. Sewing shoulders are at 105'. Additional eyelets and more looping is possible.

Figure 19:
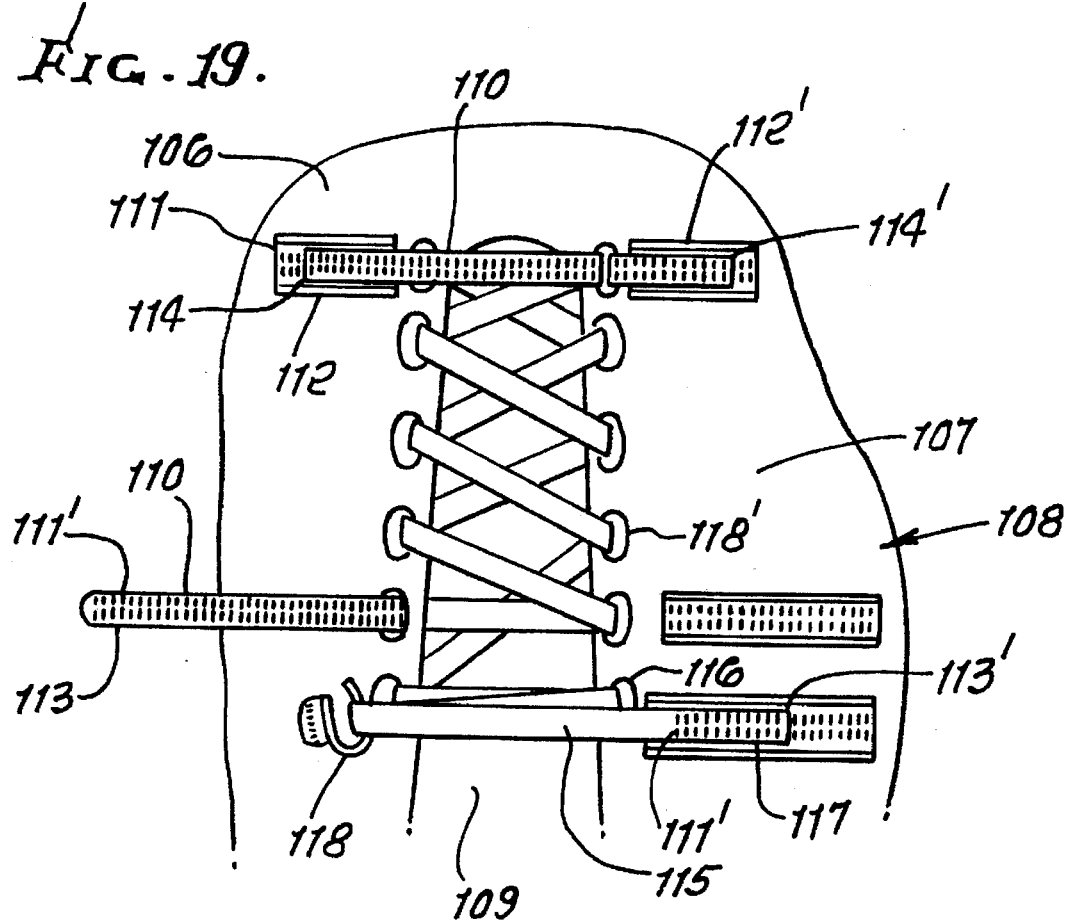
FIG. 19 is a plan view of two parts of an object, with multiple eyelets and two elongated straps, each strap having means to be adjustably connected at each end to a part.

FIG. 19 shows a plan view of first part 106, second part 107 on object 108, with adjustable opening 109. Strap 110 is adjustably connected to ridges 111 on base connector 112. If strap is too long at 113, excess material is trimmed at 114. Strap 115 is of similar configuration as strap 110 but longer. When opening 109 is opened wide, strap 115 might pull out of strap eyelet 116, if additional strap length is not provided, for instance like shoelaces.

To avoid an unconnected, loose end at 117, an auxiliary strap split eyelet and guide is provided at 118, which allows a user to maintain strap tension, while taking up strap slack without the need to thread the strap end 117 each time the opening 109 is adjusted. It should be understood that the length of the strap 110 and 115 may be greater or lesser than shown, with a corresponding increase or decrease in strap eyelets 118'. In the preferred embodiment, straps 110 and 115 would be similar to strap 25 of FIG. 3 or strap 29 of FIG. 4, so as to be reversible. Ridges 111' on straps 110 and 115 may, if desired, extend the full length of straps.

It should be understood straps 110 and 115 may be joined at 114 and 114', and length trimmed, if desired, at their opposite ends 113 and 113'. In this case, base connectors 112 and 112' would be eliminated.

Figure 20:
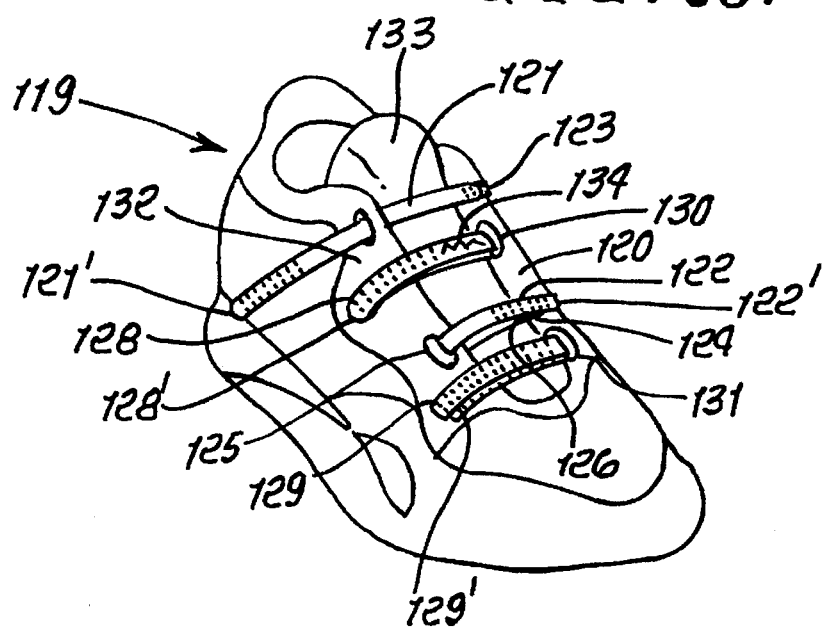
FIG. 20 is a perspective view of a sneaker showing the looping strap-like connector apparatus herein disclosed, and employed to connect upper parts of the sneaker.

FIG. 20 shows a sneaker 119, with first upper part 120, and with connector straps 121 and 122 permanently attached at 123 and 124. Strap 121 has not been connected like strap 92 of FIG. 18. Strap 122 has been looped through strap eyelet 125 and connected to itself at 126. Strap 121 is prealigned to make similar connection at 123. Connector assemblage of straps 128 and 129, and strap eyelets 130 and 131, are permanently attached to second upper part 132 of sneaker 119. Straps 121 and 128, 122' and 129', are mounted opposite each other, so that a user can gain leverage pulling strap ends 121' and 128', 122' and 129', in opposite directions, like shoelaces, in part, would be pulled. Alternately, all straps may be permanently connected on upper 120 with all eyelets on upper 132. A greater or lesser number of straps may be used.

The sneaker contains a partially inflated bladder in the tongue 133 or elsewhere configured to be compressed by looping strap connectors 121, 122, 128, and 129. Straps may carry brand name or logo, like at 134. Sneaker 119, shoes, boots, etc., may carry connector assemblies, as shown for instance in plan views of FIGS. 14, 16, 17, 18, and 19. Those connector assemblies may utilize ridge and/or ratchet connectors shown for example at FIGS. 1–13, 15, and 21–37.

Figure 21:
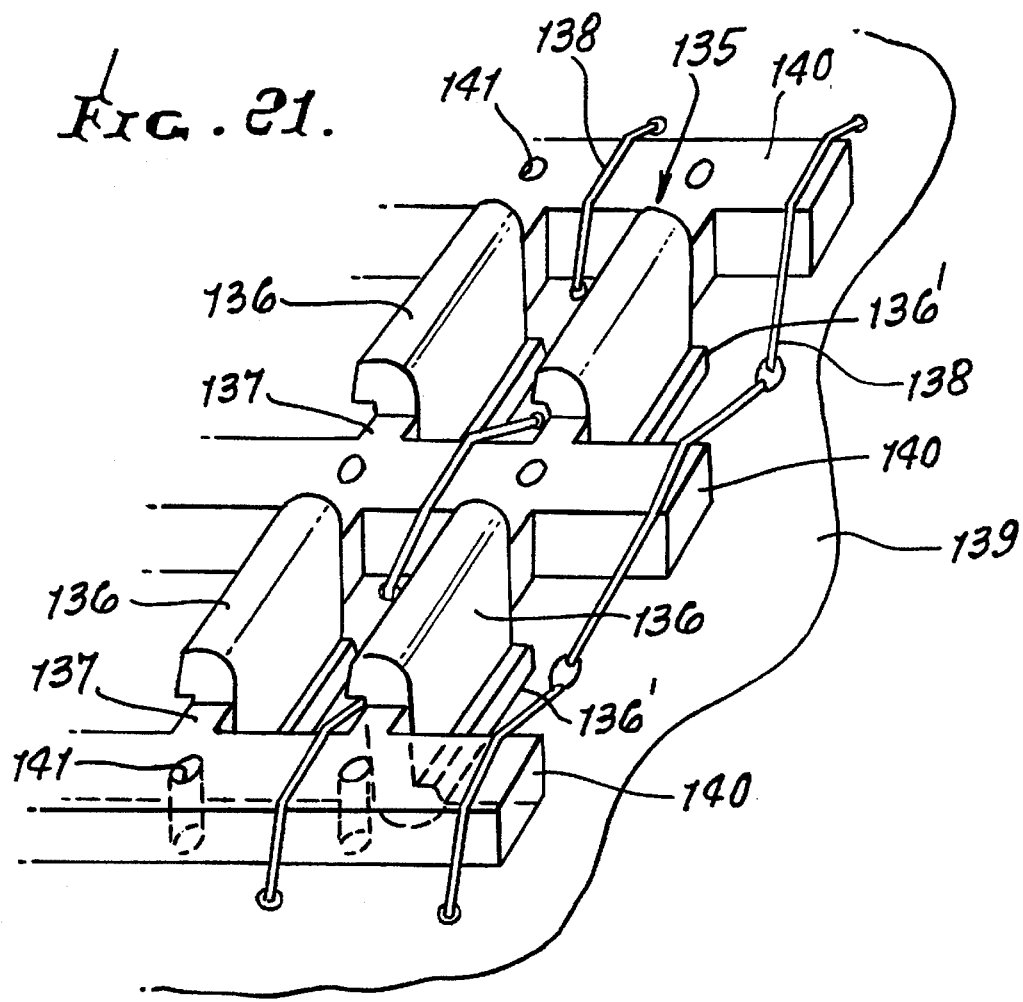
FIG. 21 is a perspective view of a connector with double-ended ridges connected to an object with thread, and with optional sewing holes.

FIG. 21 shows perspective views of part of connector 135 with double-ended, hook-like ridges 136, with end extenders 137 providing extra room for stretching 138, which connects connector to a part 139. The two rows of ridges 136 and three rows of connector members 140 may be increased to make a wider connector, or decreased to one row of ridges and two rows of connector members. An alternate method of stitching connector would be to utilize stitching holes 141.

Figure 22:
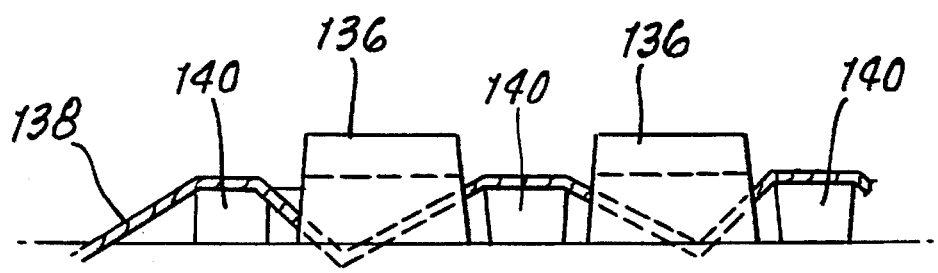
FIG. 22 is a section of the connector of FIG. 21 with optional single-ended ridges for flush mounting onto a surface, such as cloth.

FIG. 22 shows an end schematic view of the connector of FIG. 21 except the lower second end 136' of ridges 136 has been eliminated, as they are not needed if strap is intended to be sewn onto a part. Connector members 140 may proportionally be much larger than ridges 135, if desired. Ridges with double hooks on one end, like for instance sectional views of connector at FIG. 11, may be utilized. Also, it should be understood offset and lowered sewing shoulders may be added, as for instance at FIG. 1d, instead of stitching 138 as shown. Also, a preferred embodiment would have the connector sonic welded to woven strap or other part.

Figure 23:
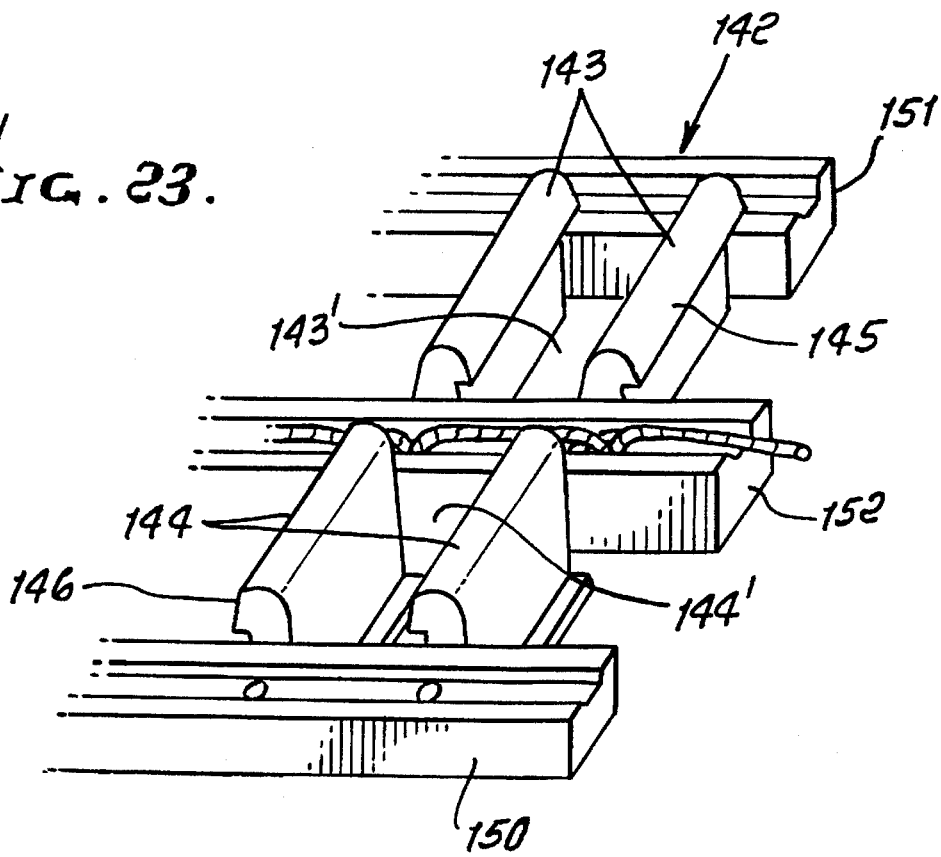
FIG. 23 is a perspective view of the connector apparatus with double-ended ridges in rows alternating direction, and with a preferred sewing method.

FIG. 23 shows perspective view of connector 142, like connector of FIG. 21, except each row of ridges 143 and 144 alternate directions of hook portions 145 and 146. Connector design is especially appropriate for use as a general utility strap. It will hold equally well in two directions, top and bottom, with looping to connect to itself or to sections of the connector, which may or may not be stitched or otherwise connected to a part. A preferred embodiment of this connector would use the double-ended, raised-recessed ridge design of FIG. 35; however, other ridge designs would be preferable for certain other uses.

Like connector at FIG. 21, the rows of ridges 143 and 144, and connector members, may be repeated as often as desired to obtain a wider connector. The spaces 143' and 144' may be increased to improve meshing around a curved object. If used as a free end strap, the outside connector members 150 and 151 may be increased in width so as to be wider than inside connector members 152. This or other means will assure that straps are properly aligned when connected to each other.

Figure 24:
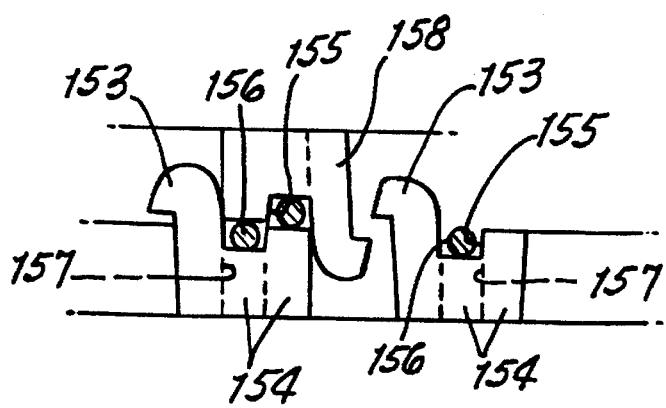
FIG. 24 is a schematic view of a preferred alternate ridge design with sewing ledges, holes and thread.

FIG. 24 is a schematic view of an alternate ridge design 153, each ridge 153 having a sewing shoulder 154 with groove for stitching 155, with stitching 156 and stitching hole locations 157. Ridge 158 has nested between ridges 153. Stitching 156 is positioned so as to avoid wear.

Figure 25:
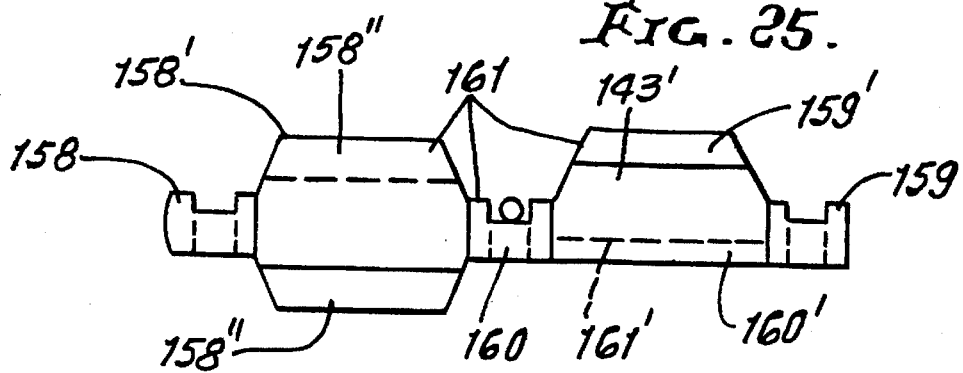
FIG. 25 is a section of the connector of FIG. 23 like FIG. 22, but with double-ended ridges and with a channel having thread holes.

FIG. 25 is an end view of connector of FIG. 23. Connector members 158 and 159, or 158, 159 and 160, may be widened to make a stronger connector 161. Ridge 158' is raised at both ends 158", and may be used for ridges 143 and 144 of FIG. 23. Alternate ridge 143' is raised at 159' and recessed at 160' with recessed reversed undercut at 161'. Ridges 159' may be used for ridges 143 and 144. Ridge 143 is similar in design as ridges at FIG. 35.

Figure 26:
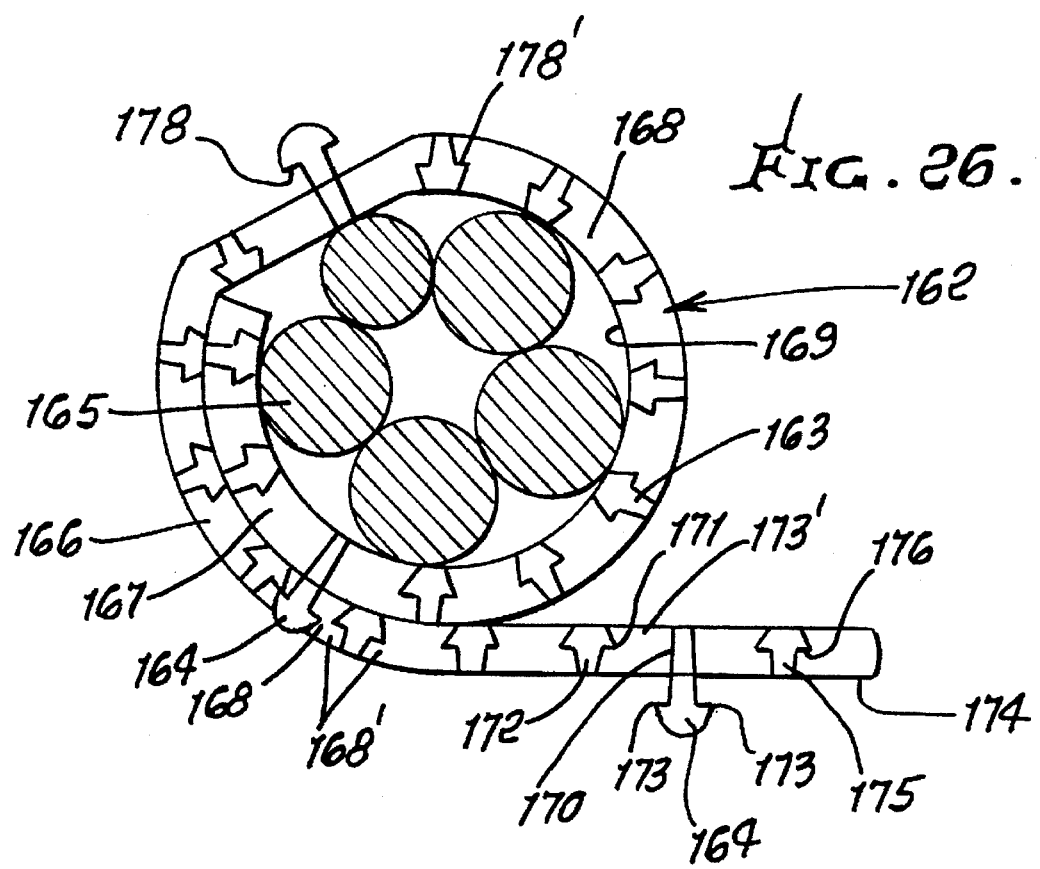
FIG. 26 shows ridges strap retention of a bundle.

FIG. 26 is a schematic view of a strap 162 with recessed double-hook ridges 163 and raised double-hook ridges 164. Strap-like connector 162 is configured to adjustably tie a small bundle 165, such as electrical wires. The circumference of the strap at 166 is greater than the circumference at 167 resulting in misalignment of raised ridges 164, with opening 168', if there were raised ridges 164 for each opening 168.

Misalignment is not a problem because relatively few raised ridges are used. If recesses 168' are, for instance, in a small strap spaced at 0.07 inches on center, ridge 164 could advance during connection to space 168' from space 168, which would increase the circumference of the strap 162 around the bundle 0.07 inches. This would result in an increase in the interior diameter 169 of strap 162 of only about 0.02 inches, which is similar to adjustments available with conventional bundle ties, which use ratchet-like buckles. Raised ridges 164 may alternate with every second to tenth or more reversed recessed ridge 163.

In the preferred configuration, approximately every fifth recessed ridge would be replaced with a reversed raised ridge 164. Also, the preferred configuration would have the space 173' between ridge 164 at 170, and hook terminus portion 171 of recessed ridge 172 approximately the same or slightly smaller than the two hook terminus 173 of ridge 164. The undercut portions 178 and 178' may be more angled and barb-like for a permanent connection. Other ridge designs may be used for this type of strap connector. Also, the skipping or lack of certain raised ridges on one side of the connector herein disclosed, in combination with recessed ridges on the other side of the connector, allows for connector surfaces to be placed flush with each other and flush over a curved surface.

Figure 27:
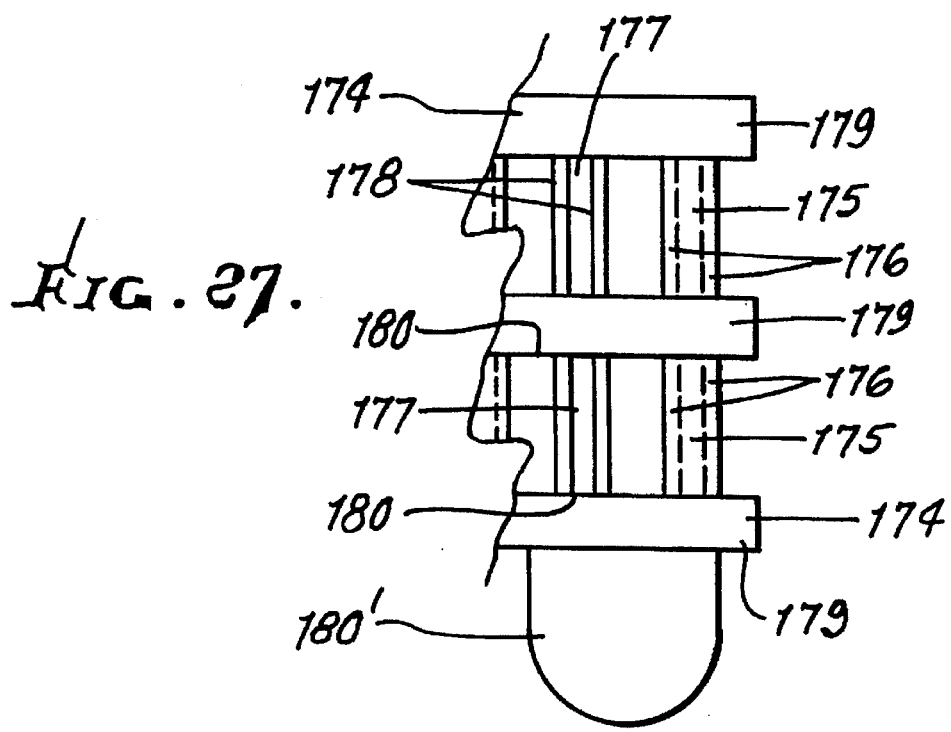
FIG. 27 is a partial plan view of a modified connector of FIG. 26, with optional double rows of ridges, instead of one, and thumb tab.

FIG. 27 is a partial plan view of strap end 174 of strap of FIG. 26, with recessed ridges 175, and undercut hook portions 176. Downwardly projecting ridge 177 also has undercut hook portions 178. Connector members 179 support the end portions 180 of the ridges 175 and 177. A thumb tab has been added at 180' to hold strap end 174 down during connection.

Figure 28:
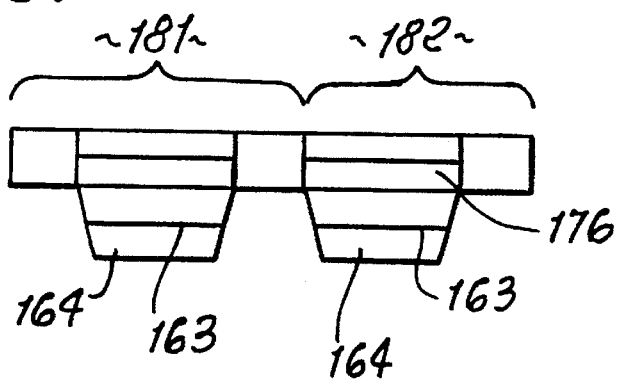
FIG. 28 is an end view of the FIG. 27 connector.

FIG. 28 shows an end view of the strap connector of FIG. 27. The connector may be made with one row of ridges and two connector members 181, or additional connector members and ridges may be added at 182.

Figure 29:
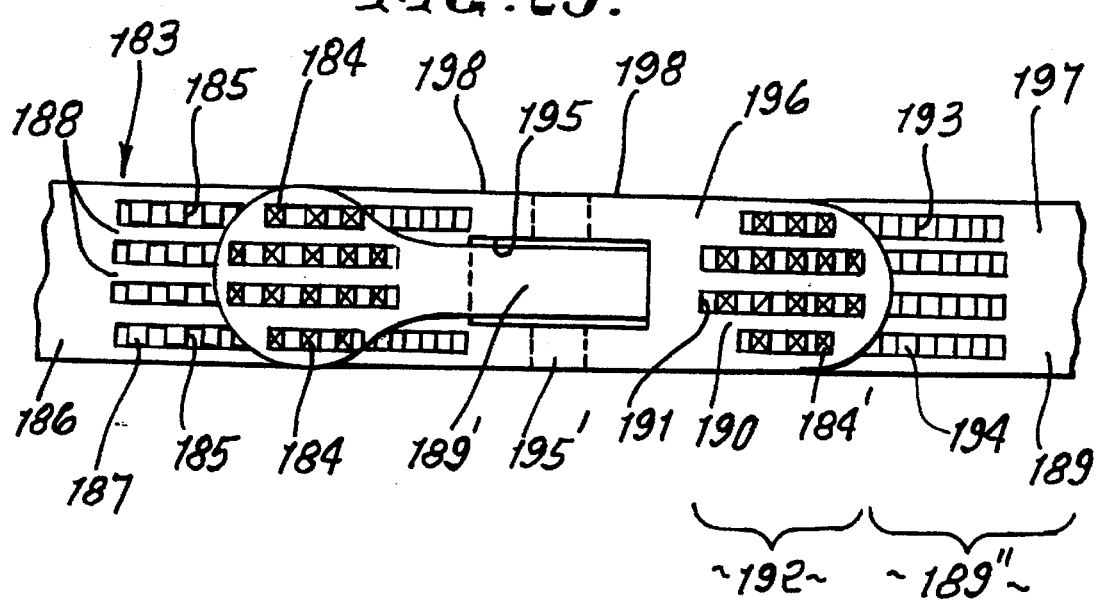
FIG. 29 is a plan view of strap connector with strap eyelet and ridges nesting.

FIG. 29 shows a plan view of a strap-like connector 183, with ridges 184 of strap second end 189 projecting and nesting in holes 185 of strap first end 186, holes 185 are formed by ridges 187 and connector members 188. Strap first end 186 has downwardly projecting ridges at 184' supported by connector members 190 with holes 191, which together form a web 192. Downwardly projecting ridges 184' nest in holes 193 of strap second end 189 and connect to ridges 194. Strap eyelet 195 in first end of strap 186 has second end of strap 189 threaded through it.

In the preferred embodiment, ridges 187 and 194 would be raised like 20' of FIG. 3, while ridges 184 and 184' would be recessed like 26 of FIG. 3, or 23 of FIG. 2. Generally, any of the connectors disclosed using ridges, ratchets, holes, or slots will work. The end portions 196 and 197 may loop and connect, or be connected, to an alternate material which will loop and connect, or connect to parts. A general utility strap may use a plurality of strap eyelets 195, which may be proportionately wider or narrower than shown, or may be like strap eyelet 33' of FIG. 4. Strap may be thicker for added strength at 198 and flair outwardly at 198, if strap eyelet 195 width is increased to width of strap at 195', in which case narrow portion 189' of first end of strap 189 would be full width. For improved leverage for a tighter fit, second end of strap 189 may be pulled and connected to second end 189 at 189" after passing through eyelet 195. In this case, ridges 184 would be configured to connect to ridges 194.

Figure 30:
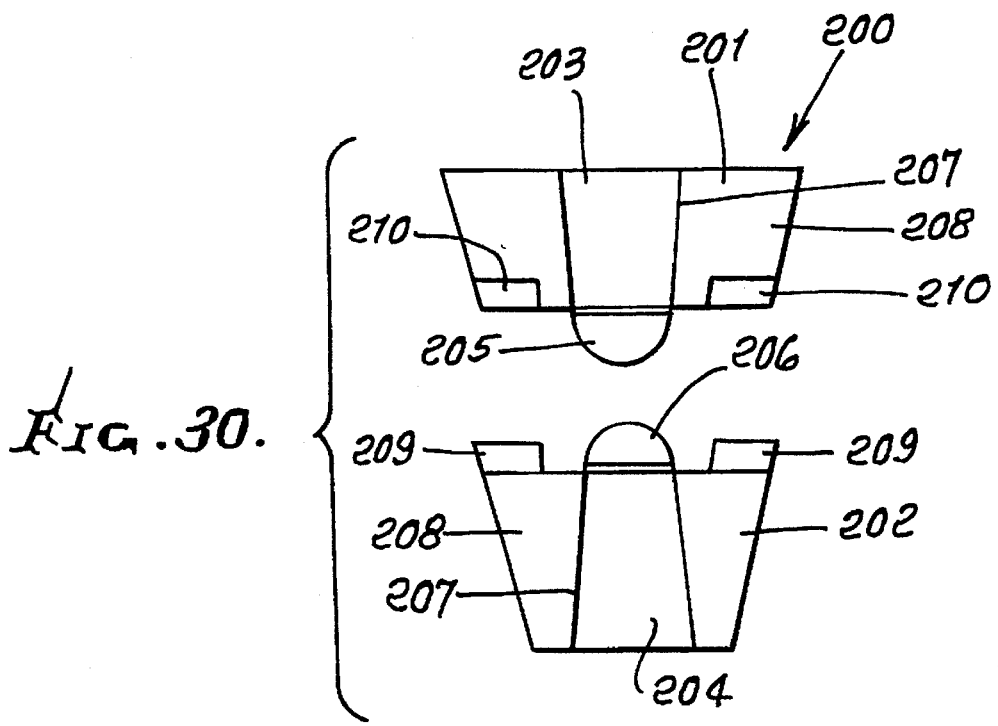
FIG. 30 shows a cross section of upper and lower parts of a belt-like connector as at section A—A of FIG. 34 laterally aligned for connection.
Figure 34:
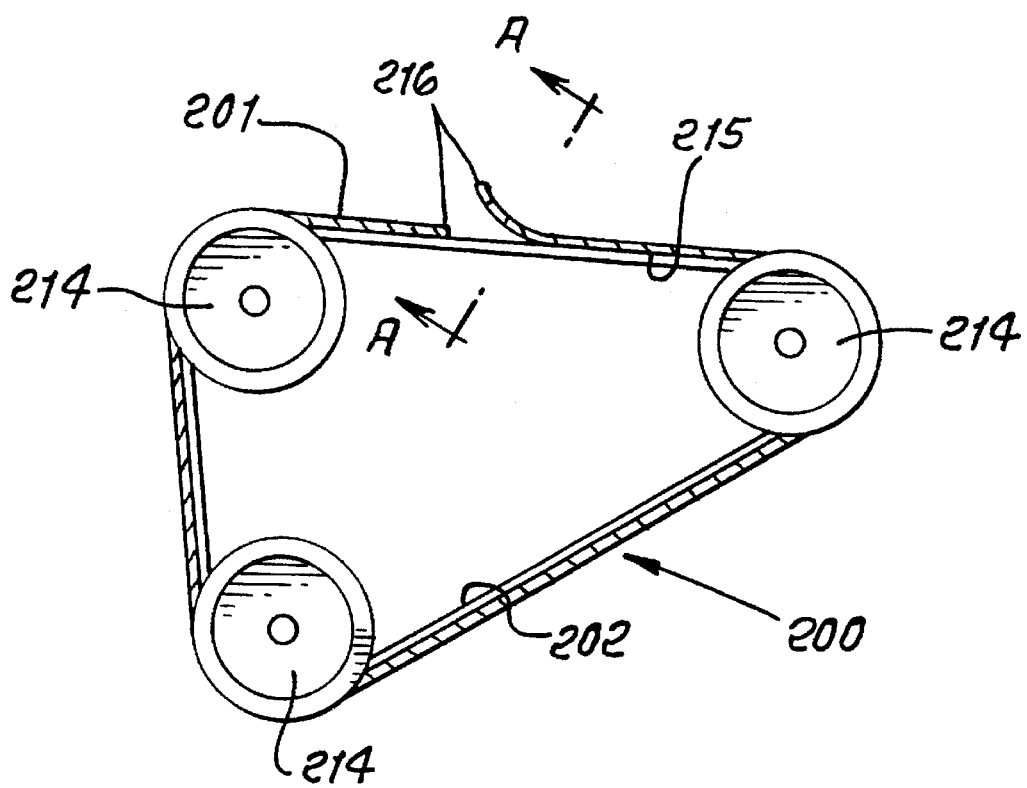
FIG. 34 shows belt entrainment of three pulleys.

FIG. 30 is a cross sectional view of a belt like connector 200, with upper portion 201 aligned to connect to lower portion 202, like at AA in FIG. 34. Ridges 203 and 204 are mostly recessed, except for non-recessed, rounded portion 205 on ridge 203 and 206, on ridge 204. Rounding laterally improves press fit connection rather than having sloping sides, like at 19 and 20 of FIG. 1b. Said lateral rounding may be used for other ridge designs. Ridges are connected laterally at 207 to side walls of belt 208, which act as connector members, like at 140 in FIG. 22. Optional lugs have been added at 209, which are sized to loosely mesh into slots 210 when ridges 205 and 206 are interlocked, like ridges 19 and 20 in FIG. 1c, and like interlock of hook-like overhangs of ridges at FIG. 2.

Figure 31:
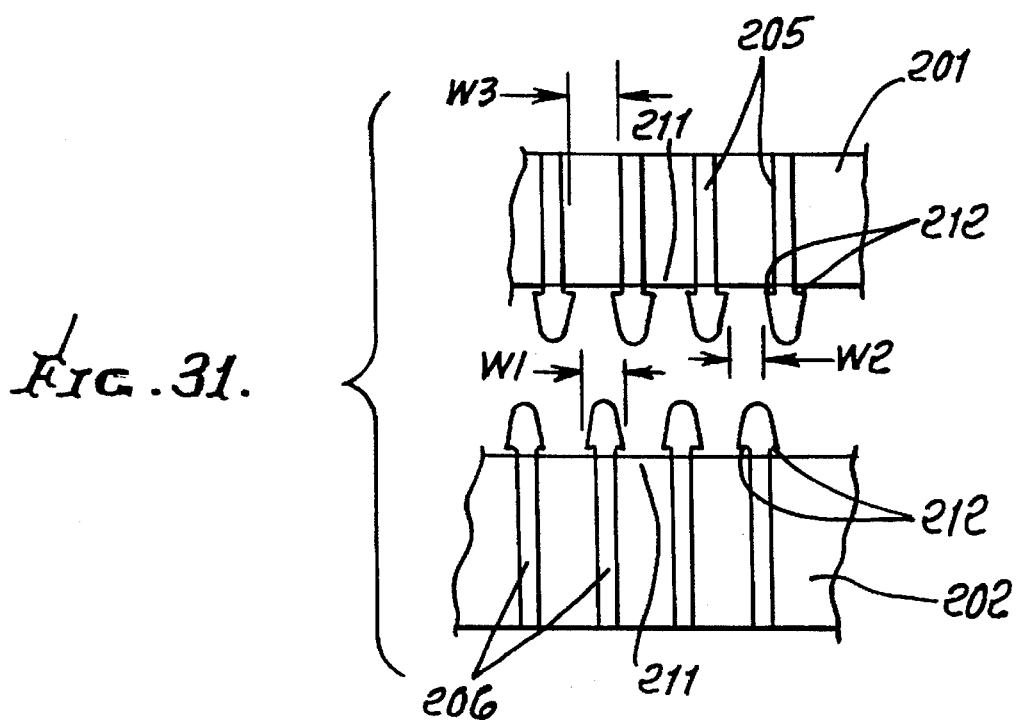
FIG. 31 is a center longitudinal view of the cross section of FIG. 30 connector, longitudinally aligned to connect.
Figure 32:
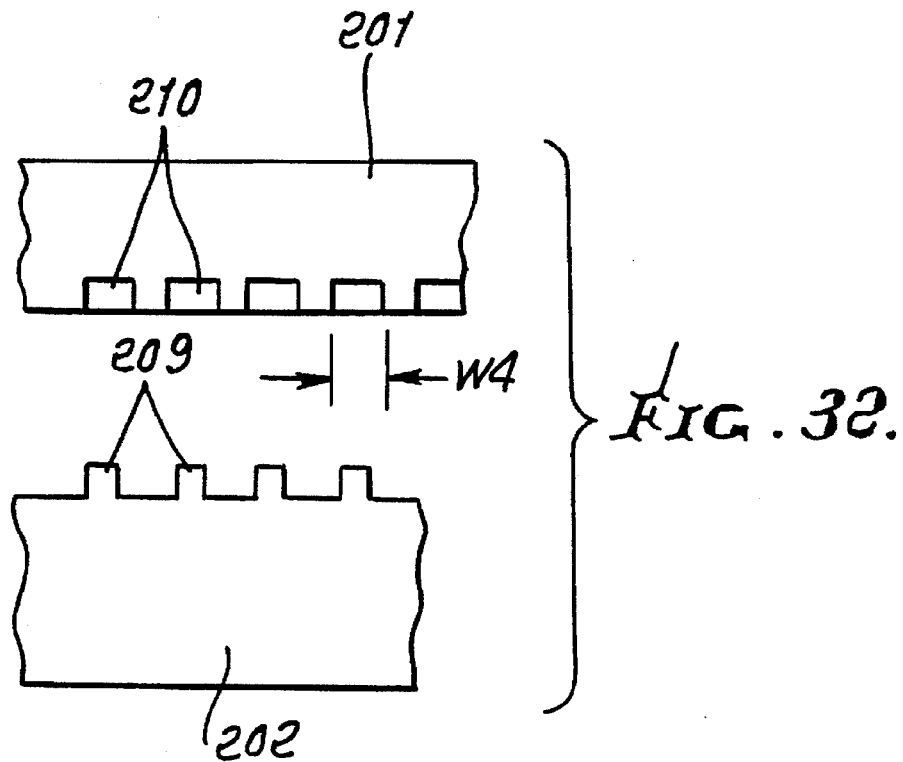
FIG. 32 is an off center longitudinal view of a cross section of connector of FIG. 30.

Lugs 209 and slots 210 at FIGS. 30 and 32 are sized longitudinally, so as to allow ridges 205 and 206 at FIG. 31 to mesh into holes 211 between ridges 205 and 206. After meshing of ridges 205 and 206 into holes 211, relatively little longitudinal movement of upper portion 201 of belt 200 may occur relative to lower portion 202 of belt 200. In FIG. 31, if for example the undercut hook-like portion 212 of ridges 203 and 204 is 0.010 inches in dimension, ridges at w1 are 0.050 inches and spaced at w2 at 0.050 inches, then ridges can allow the belt upper portion 201 to move lengthwise upwardly to 0.020 inches relative lower portion 202. Ridges 206 and 207 would, for example, be nested in holes 211 that would be sized at w2 at 0.050 inches, and undercut at 212 at 0.010 inches times 2 for a hole 211 width of approximately 0.070 inches at w3. Ridges 205 and 206, with dimension, as indicated, will allow the belt circumference to be adjusted in increments of 0.050 inches. Slots 210 at w4 would have the same dimension as holes 211 at w3, while lugs 209 would have the same width as ridges 205 and 206 at w1 less undercut 212. Lugs 209 would be aligned on belt lower portion 202 with ridges 206. This arrangement would allow the simultaneous meshing of ridges 206 and 205, and lugs 209 into slots 210 without creating an alignment problem. Lugs provide optional, additional shear strength, if desired.

Figure 33:
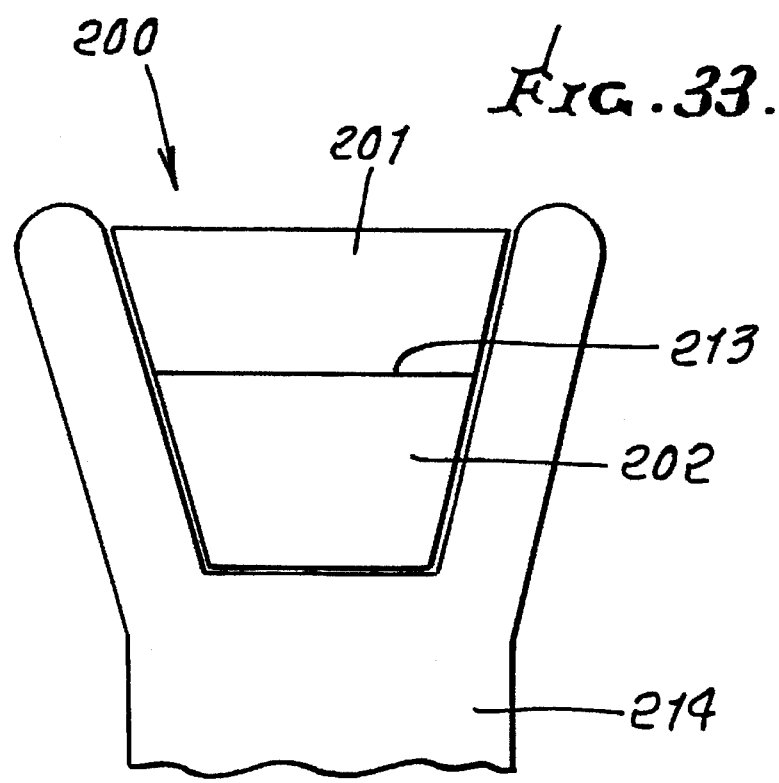
FIG. 33 is a connector of FIGS. 30, 31, 32, and 34 connected and nesting in the groove of pulley.

FIG. 33 shows a cross sectional view of upper portion 201 of belt 200, connected at 213 with lower portion 202, which in turn nests in a pulley 214.

FIG. 34 shows a cross sectional view of a belt, like connector 200, connecting or entraining three pulleys 214, as also seen in FIG. 33. Belt lower portion 202 has been butted (connected) together at 215, while belt upper portion 201 is aligned at AA, as seen in FIG. 30, and at 216. Typically, the belt upper portion would have excess lengths trimmed at 216, while the belt lower portion would likewise be trimmed at 215, to achieve desired length. An alignment and tensioning tool would connect with belt 200 upper portion 201 and lower portion 202, utilizing space 211 to grip and draw portions together. Belt portions 201 and 202 may have ridges extending their full circumference, in this case around three pulleys, or for only a portion of the belt.

Other ridge designs may be utilized. The lower portion of the belt 202 may, for instance, have recessed ridges, like 172 at FIG. 26, and raised rib channel, like side walls like 17 at FIG. 1c, nesting the upper portion 201, so the belt 201 end cross section views resemble strap 10 at FIGS. 1b and 1c. In this case, the lower portions of the belt may connect all three pulleys 214, while only a relatively short portion of upper portion of the belt 216 may be used or needed to overlap the lower belt portion at 215. Also, ridges may be utilized for belts turned 90° from those shown at FIGS. 30 and 31.

Figure 35:
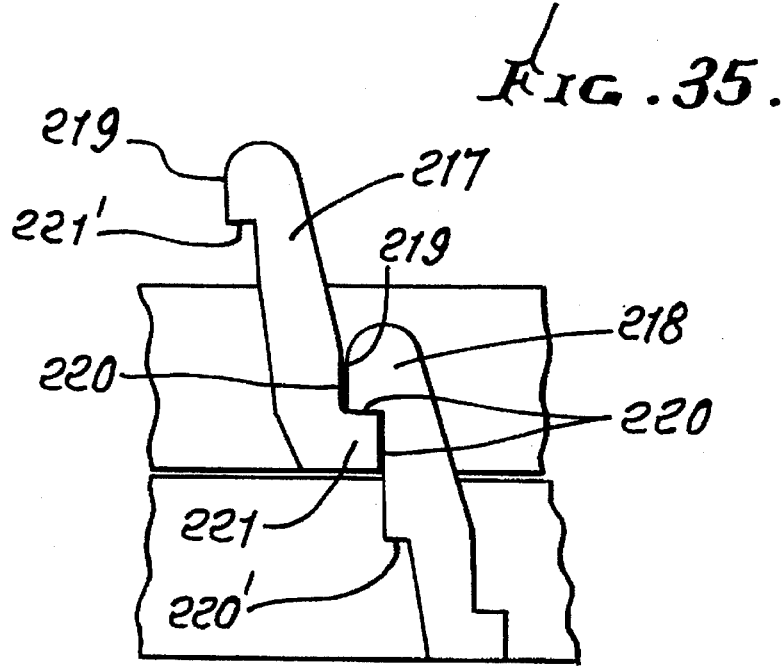
FIG. 35 shows an enlarged cross section of two connected ridges.

FIG. 35 shows a cross sectional view of ridge 217 meshed with ridge 218. Connecting surfaces 219 of ridge 217 are configured for a flush tight fit at 220 with ridge 218, which has identical configuration to ridge 217. Recessed portion of ridge 217 at 220 generally cannot flex, as it is held in place by side walls of connector member 221. Raised ridge 218 at 220 is configured to resist flex. Optional auxiliary ridge hook 220' will provide a tight connection for raised ridge hook, such as at 221'.

Figure 36:
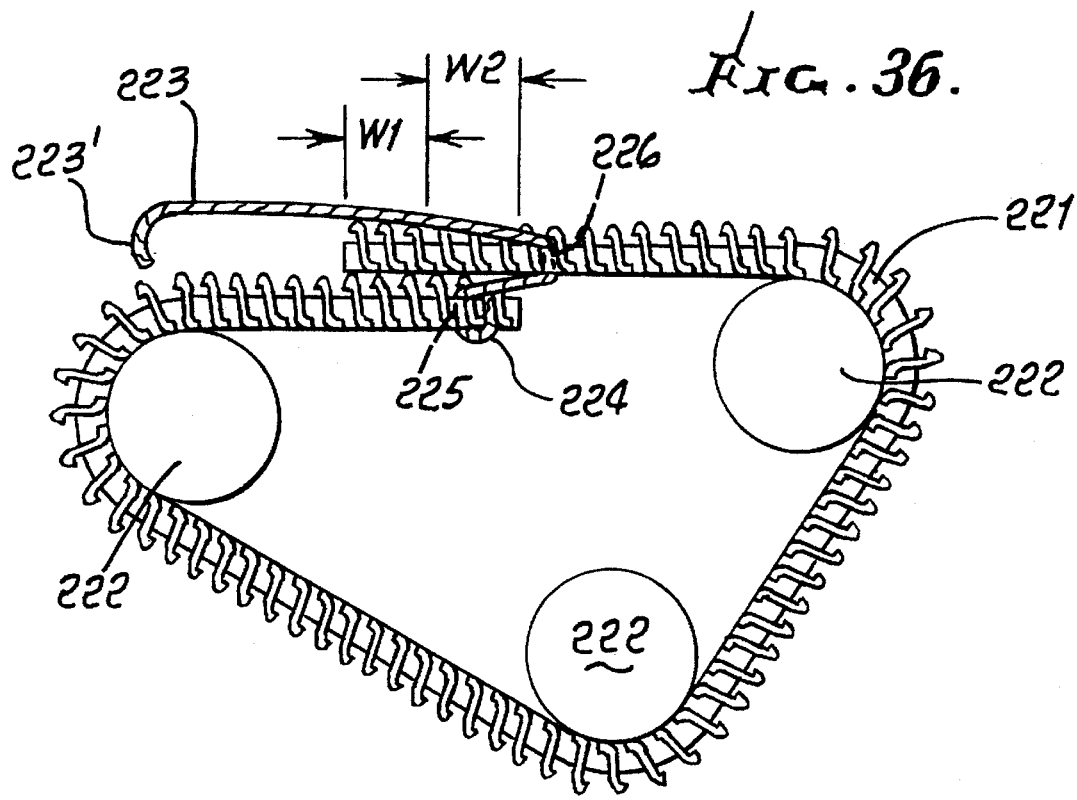
FIG. 36 shows belt entrainment of three pulleys being prior to tensioning.

FIG. 36 shows a cross sectional view of a belt 221 in the process of being connected or entraining three pulleys 222. A cord 223 can be utilized to tension and align belt 221. Cord 223 may, for example, be looped around belt at 224, threaded through belt at 225, and again at 226. Tension is applied to cord at 223', which will tighten circumference of belt 221 and allow initial press fit alignment and connection at w1. After initial connection at w1, cord 223 is removed and balance of ridges at w2 are meshed. The preferred embodiment uses ridges of FIG. 35, although other ridge designs may be used.

Figure 37:
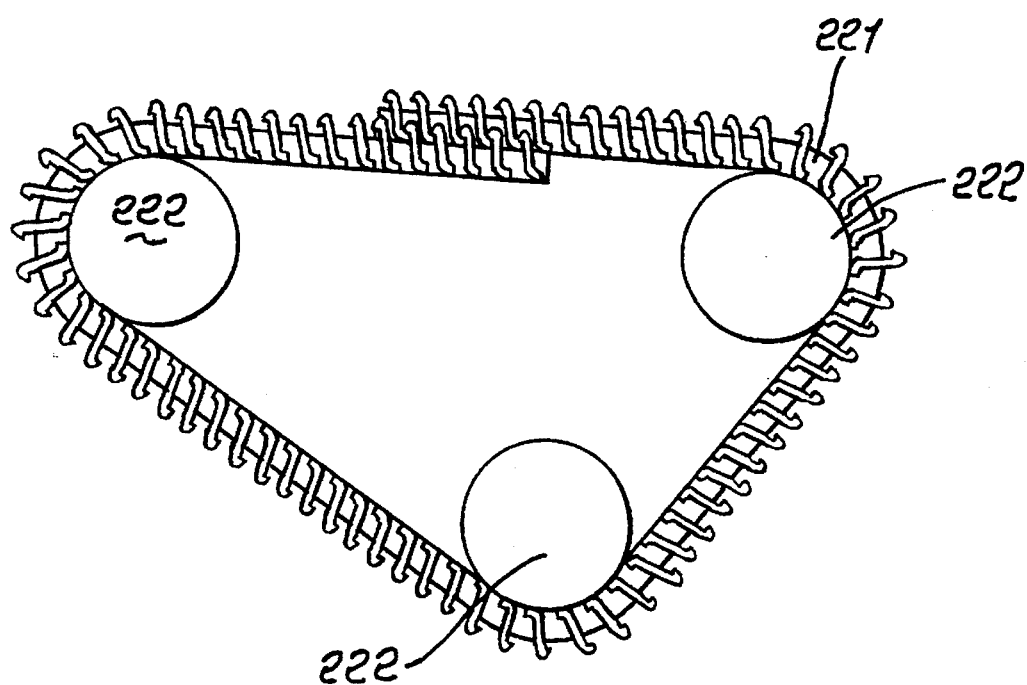
FIG. 37 shows belt entrainment of three pulleys after tensioning.

FIG. 37 shows the belt connector of FIG. 36 after tensioning and removal of cord.

Figure 38:
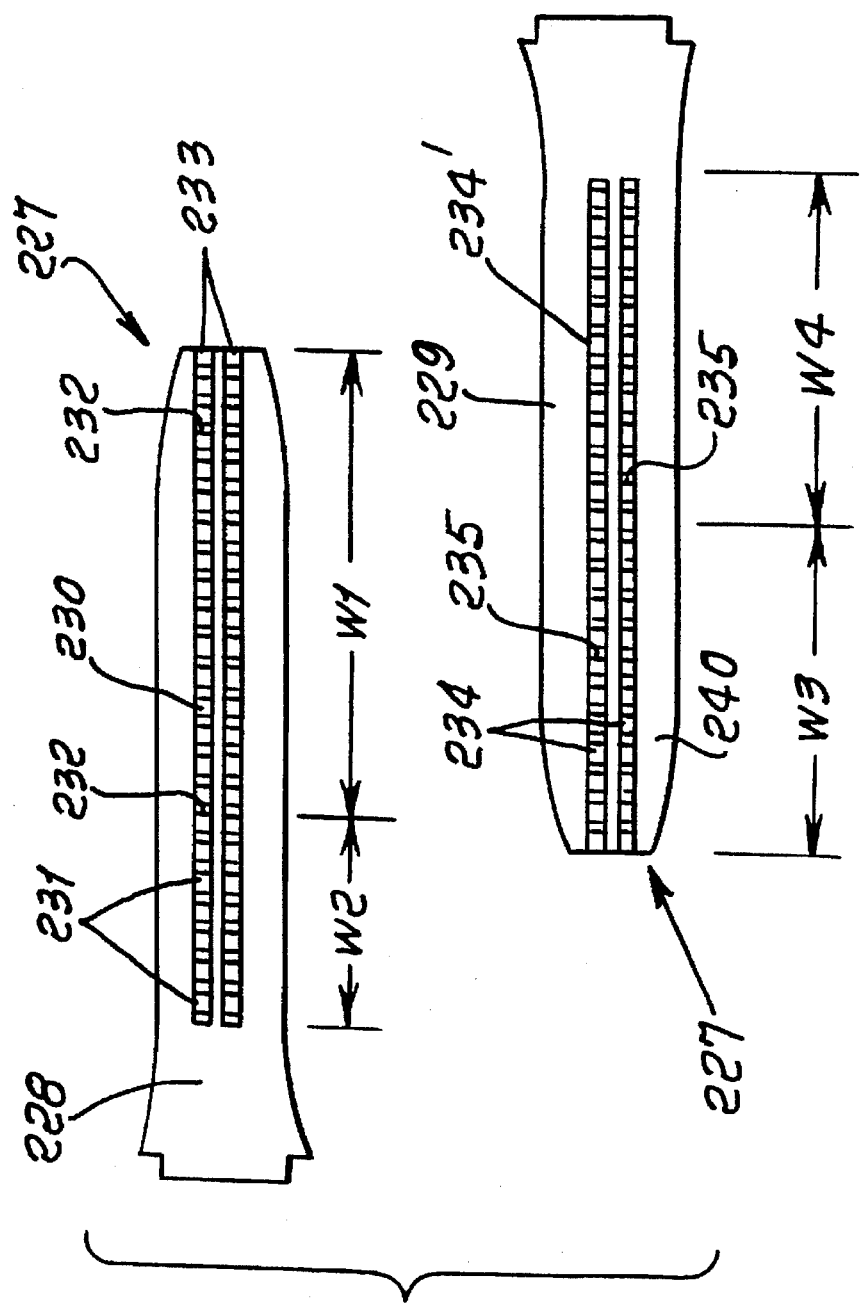
FIG. 38 shows two parts of a wrist watch strap.

FIG. 38 shows a plan view of a wrist watch strap 227 with first part 228 and second part 229. In the preferred embodiment, first part 227 would have upwardly projecting raised ridges 230 approximately extending at w1, and non-ridge strap spacer 231 flush with first part 228 surface at w2. Ridges 230 and strap spacer 231 are spaced apart by holes 232 through the strap first part 228. While two rows of ridges are shown at 233, it is understood one or a plurality of rows may be used.

In the preferred embodiment, strap second part 229 would use downwardly projecting recessed ridges 234 spaced between holes 235 configured to nest ridges 233. In the preferred embodiment, raised ridges 233 would resemble ridge 28' of FIG. 3, and recessed ridges 234 would resemble ridge 26' of FIG. 3 or 35 of FIG. 5. It is understood various types and/or combinations of ridges may be used.

For decorative purposes, strap portions 228 and 229 may be in various colors and graphic designs, including designs which change when strap first part 228 is connected to strap second part 229. Strap 227 may partially be semi-transparent in combination with graphic designs.

Figure 39:
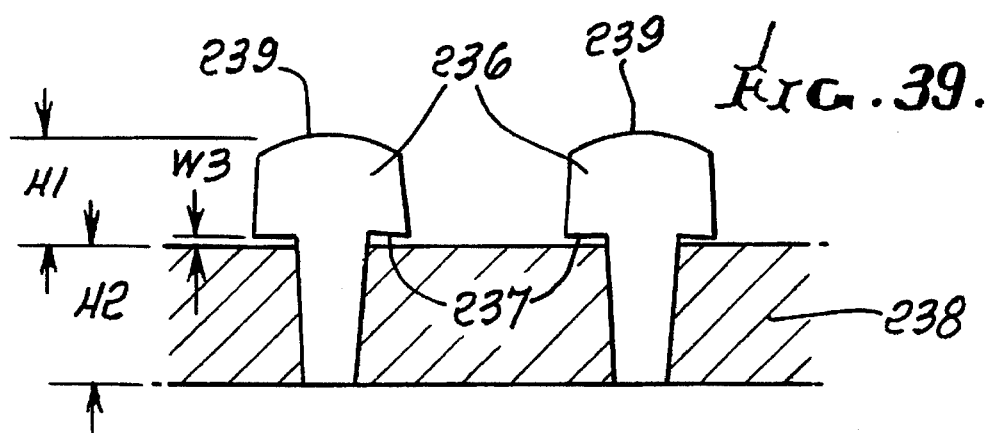
FIG. 39 shows an alternate wrist watch strap ridge design.

FIG. 39 shows a cross sectional view of two alternate preferred ridges 236 for use with strap at FIG. 38. Ridges 236 may be used for ridges 230, and may be used instead of non-ridge spacers 231. Undercut hook-like portions 237 of ridges 236 are spaced above connector member 238 from 0.0 inches to 0.01 inches at w3. Ridges 234 of strap second part 229 would also be raised ridges, like 236 at w3. Non-ridge flush strap spacer 234' would be utilized at Ridges 230 would project upwardly away from the user's wrist, while ridges 234 would project downwardly at w3, so that uneven raised surfaces of the strap, due to raised ridges, would not contact the user's wrist (not shown).

Height of ridges 236 at H1 is approximately the height of connector member 238 at H2, so that the highest portions 239 of the fully meshed ridges 230 in holes 235 would be approximately flush with upwardly projecting strap second part 229 at 240. Said flush ridges are not only decorative but allow a user to determine if a good connection has been made. The minimum space at w3 FIG. 39 generally prevents the undercut hook portions 237 from accidentally snagging threads and the like.

Figure 40:
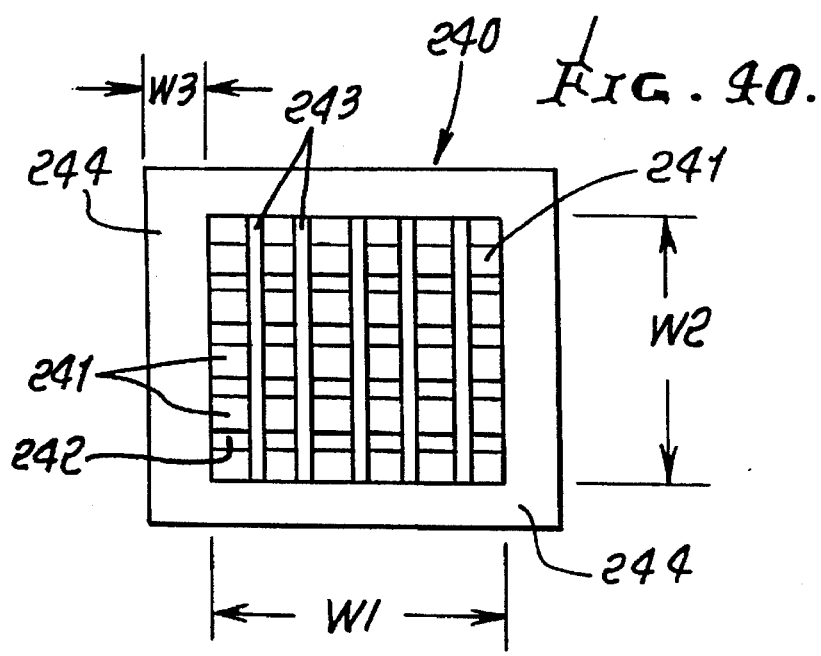
FIG. 40 shows a plan view of a connector, which may be used as a substitute for hook and loop-type connectors.

FIG. 40 is a plan view of a connector 240 which may utilize ridges of FIG. 39 at 241 or other ridges disclosed by applicant in this application or prior applications. The number of rows of ridges 241 and connector members 243 may be increased or decreased at w1, while the rows of ridges and holes 242 at w2 may likewise be increased or decreased. Connector members 243 may be increased in width to approximately a similar width w3 of sewing shoulders 244. Sewing shoulders 244 may be deleted if desired for a preferred embodiment of a strap, and replaced by wider, non-offset connector members, in which case all connector members 243 would have a width like w3 or wider. Said preferred embodiment would use ridges like at FIG. 23 and FIG. 25 or at FIG. 35 or at FIG. 39.

Figure 41:
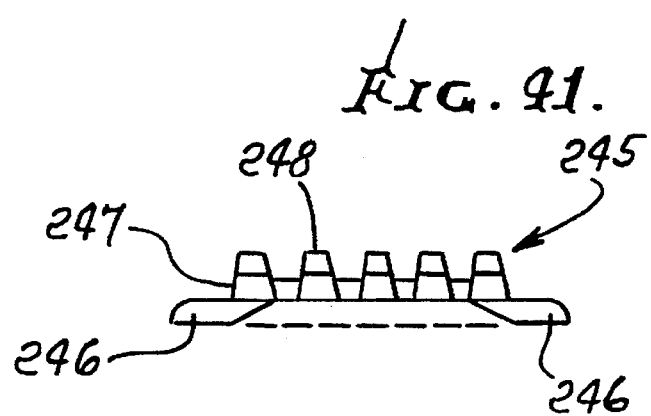
FIG. 41 shows a cross sectional view of the connector of FIG. 40 with offset sewing shoulders.

FIG. 41 is a cross sectional view of a version 245 of the connector 240 of FIG. 40. Sewing shoulders 246 are offset, and ridges 247 narrowed at their outer termini to assist pressfit connection.

In what has been described, an object having parts to be connected together may include, for example, one of the following:

a) a sneaker
b) a shoe
c) a boot
d) a wrist watch
e) woven straps
f) a helmet
g) a suitcase
h) a backpack
i) a fabric container.

Accordingly, from what has been described, there is provided the following, in a connector:

a) a plurality of ridges spaced apart and configured to grip a plurality of inverted ridges nesting between certain of said ridges, b) at least some of said plurality of ridges and inverted ridges having relatively inclined undercut portions, configured to interconnect with each other, to form an interconnection, c) strap-type or elongated connector members supporting said ridges at lateral ends thereof, d) there being holes associated with said connector members generally in alignment with the undercut portions of the ridges, e) the holes being configured to allow ridge nesting therein, f) the ridges, connector members and holes together defining the connector, g) said interconnection defining nesting looseness enabling press-together interfit of said ridges and said inverted ridges to provide a relatively strong such interfit, while also enabling peel disconnect of such interfit, and said connector having structure for controlling lateral movement of said strap-type or elongated connector members.

I claim:

1. A connector at least comprising:

a) a plurality of ridges spaced apart and configured to grip a plurality of inverted ridges nesting between certain of said ridges, b) at least some of said plurality of ridges and inverted ridges having relatively inclined undercut portions, configured to interconnect with each other, to form an interconnection, c) elongated connector members supporting said ridges at lateral ends thereof, d) there being holes associated with said elongated connector members generally in alignment with said undercut portions of said ridges, e) said holes being configured to allow ridge nesting therein, f) said ridges, connector members and holes together defining said connector, g) said interconnection defining nesting looseness enabling press-together interfit of said ridges and said inverted ridges to provide a relatively strong such interfit, while also enabling peel disconnect of said interfit, and said connector having structure for controlling lateral movement of said elongated connector members.

2. The connector of claim 1 wherein said connector has a first end that carries said plurality of ridges and is connected to a first part, and wherein said connector has a second end and is configured to loop through an eyelet associated with a second part, so as to connect said second end of said connector to said first end in an adjustable, aligned shear-resistant connection.

3. The connector of claim 2 wherein there are a plurality of said eyelets.

4. The connector of claim 3 wherein said connector has a free end configured to be pulled, so as to adjustably draw together said parts and allow adjustable connection of said connector with at least one shear-resistant ridge.

5. The connector of claim 2 wherein said first end of said connector is at the base of a structure defining a C-shaped opening and having side walls which are configured to allow nesting of said second end of said connector.

6. The connector of claim 4 wherein said side walls are configured to protect said second end of said connector from accidental disconnection.

7. The connector of claim 1 wherein said connector includes:

a) at least one end portion, b) said end portion having recessed ridges spaced between said holes configured to connect to at least one of said plurality of ridges.

8. The connector of claim 7 wherein at least one of said ridges is hook-like.

9. The connector of claim 8 wherein said hook-like ridge is configured to hook onto at least one ridge defined recessed hook.

10. The connector of claim 7 wherein at least certain of said ridges extend through said holes.

11. The connector of claim 10 wherein said holes are sized to control lateral and longitudinal movement of said ridges.

12. The connector of claim 1 wherein at least one of said plurality of ridges is characterized by at least one of the following:

a) the ridge is generally rectangular, in plan view, b) the ridge is generally rectangular, as viewed from the end of a lateral cross section of said connector, c) the ridge is generally hook-like in cross section, d) the ridge has a hook terminus which is generally pointed, e) the ridge has hook terminus which is generally chisel-like, f) the ridge is ratchet-like in cross section, g) the ridge has surfaces configured for maximum contact and minimum flex when meshed with similarly configured ridges, h) the ridge is raised, i) the ridge is recessed, j) the ridge is associated with ridges spaced apart by holes through a web configured to nest other ridges, k) said ridge generally narrows at a location furthest from an elongated connector member, as viewed from the end of a lateral cross section of said member, l) said ridge has an outer portion that is generally flat at a location furthest from an elongated connector member and is parallel to a surface defined by the strap, m) said ridge having one hook terminus, n) said ridge having a plurality of hook termini, o) said ridge has a hook terminus portion facing in the direction of a lengthwise direction of an elongated connector member, p) said ridge has a hook terminus portion facing in the direction of the side of an elongated connector member, q) said ridge has two sloping side walls that are connected to sloping connector members, so that both said ridge and said connector members slope longitudinally in one direction relative to an elongated connector member, and in cross section are ratchet-like, and are connectible with ridges and connector members similarly configured to mesh, so as to allow a one-way, ratchet-like, adjustable connection, r) the ridge is generally inflexible, s) the ridge has side walls connected to generally flexible connector members defined by said connector, t) the ridge has hook terminus structure facing in two directions at one side of an elongated connector member, u) the ridge has surfaces configured for maximum contact and minimum flex when meshed with similarly configured ridges, v) the ridge has hook terminus structure facing in one direction at one side of an elongated connector member and facing in the opposite direction at the opposite side of said member, w) the ridge has the same configuration as ridges defined by said connector, x) the ridge has different configurations than ridges defined by said connector, y) the ridge is one of a group of ridges which are hook-like, face longitudinally relative to said connector, and are flexible, z) the ridge is part of a connector, at least a portion of which is affixed to a shoe, aa) the ridge is associated with a raised rib-like channel configured to protect laterally an elongated connector member.

13. The connector of claim 1 wherein said inverted ridge is characterized by at least one of the following:

a) the ridge is generally rectangular, in plan view, b) the ridge is generally rectangular, as viewed from the end of a lateral cross section of said strap, c) the ridge is generally hook-like in cross section, d) the ridge has hook terminus which is generally pointed, e) the ridge has hook terminus which is generally chisel-like, f) the ridge is ratchet-like in cross section, g) the ridge is raised, h) the ridge is recessed, i) the ridge includes ridges spaced apart by holes through a web configured to nest other ridges, j) said ridge generally narrows at a location furthest from said strap, as viewed from the end of a lateral cross section of said strap, k) said ridge has an outer portion that is generally flat at a location furthest from said strap and parallel to a surface defined by said strap, l) said ridge having one hook terminus, m) said ridge having a plurality of hook termini, n) said ridge has a hook terminus portion facing in the direction of a lengthwise direction of said strap, o) said ridge has a hook terminus portion facing in the direction of the side of said strap, p) said ridge has two sloping side walls that are connected to sloping connector members, so that both said ridge and said connector members slope longitudinally in one direction relative to said strap and in cross section are ratchet, and are connectible with ridges and connector members similarly configured to mesh, so as to allow a one-way, ratchet-like, adjustable connection, q) the ridge is generally inflexible, r) the ridge has side walls connected to generally flexible connector members defined by said strap, s) the ridge has hook terminus facing in two directions at one side of said strap, t) the ridge has surfaces configured for maximum contact and minimum flex when meshed with similarly configured ridges, u) the ridge has hook terminus structure facing in one direction at one side of the strap and facing the opposite direction at the opposite side of said strap, v) the ridge has the same configuration as said shear-resistant ridge, w) the ridge has different configurations than said shear-resistant ridge, x) there being multiple of said ridges which are hook-like, face longitudinally relative said strap, and are flexible, y) the ridge is generally flexible, z) the ridge and associated connector member are protected laterally by two raised, longitudinal ribs which form a channel.

14. The connector of claim 1 wherein said ridges have double hook configuration.

15. A connector as defined in claim 1 and configured to adjustably connect parts, including an object consisting at least in part of said parts.

16. The connector of claim 15 wherein said object is one of the following:

a) a sneaker b) a shoe c) a boot d) a wrist watch e) woven straps
f) a helmet
g) a suitcase
h) a backpack
i) a fabric container
j) pulleys.

17. The connector of claim 16 including an auxiliary strap eyelet configured as a modified open-sided eyelet configured to allow insertion of said strap laterally and without threading, and wherein said auxiliary strap eyelet is configured to take up slack at the end of said strap.

18. The connector of claim 1 configured to adjustably connect parts, and wherein said ridges are protuberances, said elongated connector member being a strap, and there being a strap eyelet associated with at least one of said parts sized to allow said strap to loop through it and provide desired alignment for strap connection.

19. The connector of claim 18 wherein said parts are associated with an object, and including that object.

20. The connector of claim 19 wherein said object is one of the following:
a) a sneaker
b) a shoe
c) a boot
d) a wrist watch
e) woven straps
f) a helmet
g) a suitcase
h) a backpack
i) a fabric container.

21. The connector of claim 20 including an auxiliary strap eyelet configured as a modified open-sided eyelet configured to allow insertion of said strap laterally and without threading, and wherein said auxiliary strap eyelet is configured to take up slack at the end of said strap.

22. The connector of claim 1 wherein said connector includes sewing shoulders configured to allow said connector to be sewn onto a part.

23. The connector of claim 22 including a sewing strip offset and lower than adjacent connector members, so that ridges of strap connector aligned over said sewing strip during connection generally do not contact said sewing strip and prevent complete, adjusted interlock of other aligned ridges.

24. A connector as defined in claim 1 wherein said elongated connector member is a strap and wherein at least one of the following confirms complete, adjustable interlock of said ridges and connector:
  i) said ridges have taper configured to allow ridges to wedge and be gripped by restricted connector openings, when shear tension is applied to said strap,
  ii) said strap is held in place vertically by an auxiliary C-shaped opening configured to nest a relatively short portion of said strap,
  iii) said strap is held in place vertically by being threaded through adjacent strap eyelet,
  iv) said strap is held in place vertically by being threaded through a slot in said strap, which loops and is connected to itself,
  v) said strap is held in place vertically by pinching action of side walls located on an end of said strap.

25. The connector of claim 24 including an auxiliary strap eyelet configured as a modified open-sided eyelet configured to allow insertion of said strap laterally and without threading, and wherein said auxiliary strap eyelet is configured to take up slack at the end of said strap.

26. The connector of claim 24 including an object, and wherein said strap is connected to said object.

27. The connector of claim 26 wherein said object is one of the following:
a) a sneaker
b) a shoe
c) a boot
d) a wrist watch
e) woven straps
f) a helmet
g) a suitcase
h) a backpack
i) a fabric container.

28. The connector of claim 24 wherein there are connector members supporting lateral ends of said ridges, and said ratchet-like ridges and connector members together form a web.

29. The connector of claim 28 wherein said connector has a second web, and wherein ratchet-like ridges of said two webs interlock.

30. The connector of claim 29 wherein all ridges are raised in directions outstanding from the lengthwise extent of said strap.

31. The connector of claim 29 wherein certain of said ridges are raised and configured to nest between recessed ratchet-like ridges of strap connector.

32. The connector of claim 1 wherein the connector is configured to loop and connect to itself around a bundle and characterized by at least one of the following:
  a) certain of said ridges are configured to connect to inverted ridges at one side of a strap, while other ridges are configured to connect to inverted ridges at the other side of said strap,
  b) all of said ridges are raised, relative to said web,
  c) certain of said ridges are configured to connect at a first side of the connector in the form of a strap and are recessed, while others of said ridges are configured to connect at a second side of the strap connector are raised relative to said web and configured to connect to said recessed ridges,
  d) there are raised ridges and recessed ridges, and there are fewer raised ridges than recessed ridges,
  e) first ridges are configured to connect first side of a strap to second side of strap, second ridges are configured to connect to first ridges and are inverted relative first ridges, there are fewer second ridges than first ridges,
  f) random cut sections of the connector are configured to loop bundles, as ties.

33. The connector of claim 1 including an object, and wherein said connector is combined with said object by a sonic weld.

34. The connector of claim 1 including the combination comprising:
  a) a connector having at least a first end and a second end, first end being adapted to be adjustably connected to second end,
  b) a support and a strap eyelet located on said first end to receive and guide feeding of said second end therethrough, and allow adjustable connector tightening,
  c) and interlockable ridges at different locations on said connector such that at least some of said ridges register during said connector tightening, to be pressed together for adjusted and confirmed complete interlock, thereby to hold the connector in and against dislodgement.

35. The connector of claim 34 wherein said first and second ends are affixed to parts, so as to allow said parts to be adjustably connected.

36. The connector of claim 35 including said parts defining an object.

37. The connector of claim 34 wherein said second end loops through strap eyelet on said first end, is folded back and connects to itself, there being no ridges on said first end connecting to ridges on said second end.

38. The connector of claim 24 wherein said connector includes bendable metallic spikes configured to penetrate cloth and clamp to a backing plate, so as to affix said connector to said cloth.

39. The connector of claim 1 wherein there is at least one relatively small, flexible flap associated with at least one ridge configured to provide a tighter fit for said one ridge when nested in a hole.

40. A connector as defined in claim 1, and further characterized as comprising:

a) a strap-like connector configured to loop and connect to itself, b) a plurality of double-ended ridges spaced apart and configured to connect to similarly configured ridges, c) first ends of said ridges on a first side of said connector, d) second ends of said ridges on a second side of said connector, e) first and second ends of said ridges having undercut portions oriented in opposite directions, which are configured to connect.

41. The connector of claim 39 wherein first ends of said ridges are raised and configured to connect a first side of said connector to a second side of said connector, which has second ends of said ridges, and which are recessed.

* * * * *